US012491172B2

(12) United States Patent
Pereira

(10) Patent No.: US 12,491,172 B2
(45) Date of Patent: Dec. 9, 2025

(54) TREATMENT OF DIABETES

(71) Applicant: Teresa Pereira, Sollentuna (SE)

(72) Inventor: Teresa Pereira, Sollentuna (SE)

( * ) Notice: Subject to any disclaimer, the term of this patent is extended or adjusted under 35 U.S.C. 154(b) by 999 days.

(21) Appl. No.: 17/608,720

(22) PCT Filed: May 8, 2020

(86) PCT No.: PCT/EP2020/062905
§ 371 (c)(1),
(2) Date: Nov. 3, 2021

(87) PCT Pub. No.: WO2020/225427
PCT Pub. Date: Nov. 12, 2020

(65) Prior Publication Data
US 2022/0287999 A1    Sep. 15, 2022

(30) Foreign Application Priority Data

May 9, 2019 (SE) .................................. 1950557-7

(51) Int. Cl.
A61K 31/198 (2006.01)
A61P 3/10 (2006.01)
(52) U.S. Cl.
CPC .............. A61K 31/198 (2013.01); *A61P 3/10* (2018.01)
(58) Field of Classification Search
CPC ................................ A61K 31/198; A61P 3/10
See application file for complete search history.

(56) References Cited

U.S. PATENT DOCUMENTS

2017/0189440 A1*  7/2017  Montminy ........... A61K 31/713

FOREIGN PATENT DOCUMENTS

WO    WO 2012/082765 A3    6/2012
WO    WO-2012082765 A2 *   6/2012  ........... A61K 31/473

OTHER PUBLICATIONS

Gonzalez et al., "The role of hypoxia-inducible factors in metabolic diseases", Nature Reviews, Endocrinology, Jan. 2019, 15: 21-32.
He et al., "A review on the pharmacological effects of vitexin and isovitexin", Fitoterapia, 2016, 115: 74-85.
Yamaguchi et al., "Echinomycin inhibits adipogenesis in 3T3-L1 cells in a HIF-independent manner", Scientific Reports, 2017, 7:6516, 13 pages.
Tan et al., "Type 1 and 2 diabetes mellitus: a review on current treatment approach and gene therapy as potential Intervention", Diabetes & Metabolic Syndrome: Clinical Research & Reviews, Oct. 10, 2018, 13: 364-372.

* cited by examiner

*Primary Examiner* — Deborah D Carr
(74) *Attorney, Agent, or Firm* — James S. Keddie; Bozicevic, Field & Francis LLP

(57) ABSTRACT

Disclosed herein is the use of a HIF-1α inhibitor for preventing, delaying or treating diabetes mellitus in a subject. The subject is susceptible to, or has diabetes mellitus and has elevated non-fasting blood glucose, and/or elevated fasting blood glucose, and/or impaired glucose tolerance and/or elevated hemoglobin A1c levels. In particular, the present disclosure relates to the use of a HIF-1α inhibitor, wherein the HIF-1α inhibitor is administered to the subject, thereby maintaining or providing increased non-fasting plasma insulin levels in said subject.

11 Claims, 18 Drawing Sheets

TREATMENT OF DIABETES

CROSS-REFERENCE TO RELATED APPLICATIONS

This application is a § 371 national phase of International Application No. PCT/EP2020/062905, filed on May 8, 2020, which claims the benefit of Swedish Application No. 1950557-7, filed on May 9, 2019, which applications are incorporated by reference herein.

TECHNICAL FIELD

The present disclosure relates to the use of HIF-1α inhibitors for preventing, delaying onset or progression of, or treating diabetes. BACKGROUND The worldwide incidence of diabetes mellitus and related comorbidities is increasing at an alarming rate and has become one of the most difficult challenges in modern public health. Diabetes mellitus type I is an autoimmune disease marked by the dysfunction and/or destruction of insulin-producing beta cells found in the pancreatic islets of Langerhans. Type I diabetes arises mostly in children but can also develop in adults. To compensate for impaired beta cell function these patients are treated with daily insulin therapy. Diabetes mellitus type II develops in response to overnutrition and lack of physical activity in subjects that have an underlying genetic and/or acquired predisposition to both insulin resistance and beta cell dysfunction. Insulin resistance refers to a state in which a certain concentration of insulin produces less biologic effects than expected. In insulin resistant states, pancreatic islets usually respond by increasing insulin secretion to maintain normoglycemia, a process termed beta cell compensation. The mechanisms involved in beta cell compensation include expansion of beta cell mass and enhanced beta cell function. The inability to sustain the beta cell compensatory response leads to the development of diabetes mellitus type II.

Current treatments of type II diabetes include, besides insulin, several types of glucose-lowering therapies. Metformin is the first-line therapy for a majority of patients with type II diabetes and has been shown to reduce hepatic glucose production. Thiazolidenediones increase insulin sensitivity by acting on peroxisome proliferator-activated receptor-γ (PPARγ) in adipose tissue, muscle and the liver to increase glucose utilization and decrease glucose production. Other drugs, such as sulfonylureas and other insulin secretagogues, increase secretion of insulin by keeping the ATP-sensitive potassium channels closed leading to a rise in cytosolic calcium and insulin exocytosis. Secretion of insulin increased by insulin secretagogues is not glucose regulated, leading to a long term negative impact on beta cell function. Glucagon-like peptide 1 (GLP-1) receptor agonists are a class of drugs that have a positive impact on beta cell function by increasing glucose-dependent insulin secretion, besides other beneficial effects on diabetes treatment such as lowering postprandial glucagon levels and reducing caloric intake. Dipeptidyl peptidase 4 inhibitors decrease the rapid degradation of GLP-1 leading to an increase in its biological activity. Finally, the most recent class of drugs used in diabetes treatment are the sodium/glucose cotransporter 2 (SGLT2) inhibitors that have an entirely insulin-independent mode of action through increase urinary excretion of glucose.

In WO2012/082765 a method of treating diabetes by administrating a HIF-1α inhibitor is disclosed. The tested HIF-1α inhibitor is Acriflavine. Another HIF-1a inhibitor called PX-478 has been shown to have antitumor activity against various solid tumors, including non-small cell lung cancer, that was correlated with tumor HIF-1α levels and was accompanied of massive apoptosis (Welsh, et al., 2004; Jocoby et al., 2010). Studies in mice with xenographs of pancreatic, glioma and squamous cells showed that PX-478 also provides tumour sensitization to radiation (Schwartz, et al, 2009; Schwartz et al., 2010). In a mouse model of breast cancer it was shown that administration of PX-478 enhanced the anti-tumor effects of dendritic cell-based vaccination (Kheshtchin, et al., 2016). Inhibition of HIF-1α by PX-478 showed to prevent pathological extraskeletal bone formation that occurs due to genetic predisposition or following mechanical trauma, burns and orthopedic operations (Agarwal, et al., 2015). Furthermore, it has been shown that PX-478 suppresses HFD-induced HIF-1α activation in adipose tissue Sun et al., 2013).

The increased incidence of diabetes and the challenges associated therewith call for new substances for use in treatments of diabetes.

SUMMARY

It is an object of the present invention to at least partly reduce or overcome the problems in the prior art, and to provide new means for treatment or prevention of diabetes mellitus in a subject.

This and other objects, which will be apparent to a skilled person from the present disclosure, are achieved by the different aspects of the disclosure as defined in the appended claims and as generally disclosed here.

In a first aspect of the present disclosure, there is provided a HIF-1α inhibitor for use in preventing or delaying an onset of diabetes mellitus, or in preventing or delaying progression of diabetes mellitus, or in treating diabetes mellitus in a subject. The subject may be susceptible to or may have diabetes mellitus, and the subject may have elevated non-fasting blood glucose, and/or elevated fasting blood glucose, and/or impaired glucose tolerance and/or elevated hemoglobin A1c levels and/or decreased plasma insulin and/or c-peptide levels. The HIF-1α inhibitor may be administered to the subject and the administration of the inhibitor may thereby lead to maintained or increased non-fasting plasma insulin and/or c-peptide levels in the subject. It has surprisingly been found that administration of a HIF-1α inhibitor to a subject having symptoms as defined above, provides for a maintained or increased non-fasting plasma insulin and/or c-peptide level in said subject, and use of the inhibitor as set out herein may thereby prevent or delay onset of diabetes mellitus, or may prevent or delay progression of diabetes mellitus, or may treat diabetes mellitus in said subject. As the skilled person will understand, any subject that is susceptible to diabetes mellitus, or is prediabetic, or has diabetes mellitus, may benefit from a maintained or increased insulin level in plasma. This may reduce any diabetes related symptoms experienced by the subject. Non-fasting plasma insulin levels can for example be measured by using an ELISA kit detecting human insulin.

In a second aspect of the present disclosure, there is provided a HIF-1α inhibitor for use in preventing or delaying an onset of diabetes mellitus, or in preventing or delaying progression of diabetes mellitus, or in treating diabetes mellitus in a subject. The subject may be susceptible to or may have diabetes mellitus, and the subject may have elevated non-fasting blood glucose, and/or elevated fasting blood glucose, and/or impaired glucose tolerance and/or elevated hemoglobin A1c levels. The HIF-1α inhibitor may be administered to the subject and the administration of the inhibitor may thereby lead to maintained or increased non-fasting plasma insulin levels in the subject. It has surprisingly been found that administration of a HIF-1α inhibitor to a subject having symptoms as defined above, provides for a maintained or increased non-fasting plasma insulin level in said subject, and use of the inhibitor as set out herein may thereby prevent or delay onset of diabetes mellitus, or may prevent or delay progression of diabetes mellitus, or may treat diabetes mellitus in said subject. As the skilled person will understand, any subject that is susceptible to diabetes mellitus, or is prediabetic, or has diabetes mellitus, may benefit from a maintained or increased insulin level in plasma. This may reduce any diabetes related symptoms experienced by the subject. Non-fasting plasma insulin levels can for example be measured by using an ELISA kit detecting human insulin.

The subject may also be susceptible to or have decreased plasma insulin and/or c-peptide levels. Measuring C-peptide can help to determine how much of natural insulin a subject is producing as C-peptide is secreted in equimolar amounts to insulin. C-peptide levels are measured instead of insulin levels because C-peptide can assess a person's own insulin secretion even if they receive insulin injections. C-peptide may be a better measure of portal insulin secretion than insulin itself. Thus, the administration of the HIF-1α inhibitor may analogously lead to maintained or increased c-peptide levels in the subject. Any subject that is susceptible to diabetes mellitus, or is prediabetic, or has diabetes mellitus, may benefit from a maintained or increased c-peptide level in plasma. This may reduce any diabetes related symptoms experienced by the subject. Thus, in one embodiment the use according to this aspect provides sustained or increased plasma insulin and/or c-peptide levels.

A subject which is "susceptible to diabetes mellitus" should be understood by a person skilled in the art as any subject that may have a higher risk of developing diabetes mellitus, as to compared to the population in general. A subject may be susceptible to diabetes type I because of a certain genetic predisposition, or may be susceptible because of a virus infection in the context of a specific genetic predisposition. A subject may be susceptible to diabetes type II diabetes due to lifestyle related factors (such as obesity, and/or insufficient physical exercise), or may be susceptible because of genetic predisposition (such as mutations and/or single-nucleotide polymorphisms, or due to another type of type II diabetes), or may be susceptible due to specific epigenetic changes due to the lifestyle of the subject's ancestors. In one embodiment, the HIF-1α inhibitor is PX-478 or a pharmaceutically acceptable salt, derivative or active metabolite thereof. PX-478 is a commercially available small molecule compound that inhibits the activity HIF-1α and is known to induce apoptosis in experimental tumor models, as disclosed elsewhere herein. Use of this particular inhibitor is disclosed in the appended Examples.

In one embodiment, said HIF-1a inhibitor is administered orally. Oral administration may in particular be contemplated when said inhibitor is PX-478. Alternatively, the inhibitor may be administered by intraperitoneal injection, intravenous injection or by subcutaneous injection.

In one embodiment, said inhibitor is administered to said subject once per week. In an alternative embodiment, said inhibitor is administered to said subject every second day. In another embodiment, said inhibitor is administered at least once per week but no more than every second day. The frequency of administration may herein be referred to as administration frequency.

In one embodiment, said HIF-1α inhibitor is administered at an administration frequency of twice per week. As can be understood, for reasons of e.g. of compliance and/or economic reasons, it may be advantageous for the subject to receive treatment less frequently.

The phrase "treatment" as used herein should be understood as encompassing preventive treatment, such as prophylactic inhibition of disease or symptom onset, and therapeutic treatment, for example to prevent, delay or alter the natural course or progression of a disease.

In one embodiment, said inhibitor is administered to said subject for a treatment period of at least 1-12 weeks, such as 1 week or at least 1 week, such as 2 weeks or at least 2 weeks, such as 3 weeks or at least 3 weeks, such as 4 weeks or at least 4 weeks, such as 5 weeks or at least 5 weeks, such as 6 weeks or at least 6 weeks, such as 7 weeks or at least 7 weeks, such as 8 weeks or at least 8 weeks, such as 9 weeks or at least 9 weeks, such as 10 weeks or at least 10 weeks, such as 11 weeks or at least 11 weeks, such as 12 weeks or at least 12 weeks. In some instances, said maintained or increased non-fasting insulin level is observed after such a treatment period. Thus, in some instances said effect can be observed after one week, in other instances after two weeks, three weeks, four weeks etc. In conjunction with a maintained of increased non-fasting insulin level, said subject may also demonstrate an elevated level of insulin secretion. This may in turn further prevent or delay an onset of diabetes mellitus, or prevent or delay a progression of diabetes mellitus, or treat diabetes mellitus in a subject.

Thus, non-fasting plasma insulin (and c-peptide) levels may be maintained or increased after a period of treatment as set out above. A maintained level should be understood as a level that remains substantially the same as before administration of said inhibitor. Insulin (or c-peptide) levels can thus be measured prior to and after administration of said inhibitor, such as at a suitable time period after administration.

In one embodiment, the HIF-1α inhibitor is administered to a prediabetic subject. A prediabetic subject may be identified as a subject having impaired glucose tolerance or impaired fasting glucose. Treatment of a prediabetic subject with an HIF-1α inhibitor according to the present disclosure, may prove particularly advantageous in preventing or delaying an onset of diabetes mellitus in a subject.

In one embodiment, the subject has not yet developed a severe diabetic symptom. A severe symptom may be one or more of a diabetic foot ulcer, severe diabetic kidney disease or a diabetes associated cardiovascular problem. It might also be any other severe diabetic symptom, apparent to persons of skill in the art.

In one embodiment, the subject is treated with one or more drugs used in treatment of diabetes mellitus, such drugs being known to persons of skill in the art. In other embodiments, the subject is not treated with any other drug used in treatment of diabetes mellitus. Thus, during a treatment period for example as the one set out above, a subject may receive treatment with both said HIF-1α inhibitor and with one or more drugs used in treatment of diabetes mellitus. Non-limiting examples of other drugs are insulin, metformin a GLP-1 analogue, and a SGLT2 inhibitor. This does not necessarily imply that said HIF-1α inhibitor should be administered simultaneously or in conjunction with any other drug used in treatment of diabetes mellitus. Should the subject also be treated with another drug used in treatment of diabetes mellitus, the other drug and said inhibitor may be administered to said subject independently. In other words, said HIF-1α inhibitor may be the only the drug used by the subject for treatment of diabetes, or it may one of several drugs used by the subject for treatment of diabetes.

As apparent to a person of skill in the art, reduction of the body weight of a subject having diabetes mellitus is typically positive. However, the maintained or increased non-fasting plasma insulin and/or c-peptide levels in the subject that is attained with an inhibitor as set out herein, may be observed even if the body weight of the subject is not effected. For example, use of the HIF-1α inhibitor according to the present disclosure may not affect the body weight of the subject. It is hypothesized that this is due to that the main effect of said inhibitor is in pancreatic beta cells and not in adipose cells.

In one embodiment, the diabetes mellitus is diabetes mellitus type II.

In one embodiment, the diabetes mellitus is diabetes mellitus type I.

In one embodiment, use of the HIF-1α inhibitor according to any aspect of the present disclosure further provides decreased blood glucose in a subject. An elevated level of glucose in the blood is a typical symptom of diabetes mellitus. Consequently, decreasing blood glucose in a subject may lead to the subject experiencing fewer or reduced diabetes related symptoms. This may further prevent or delay progression of diabetes mellitus, or prevent or delay onset of diabetes mellitus, or treat diabetes mellitus.

In one embodiment, use of the HIF-1α inhibitor according to the present disclosure further provides increased glucose tolerance in the subject. An increased glucose tolerance may be defined as described elsewhere herein.

As an elevated level of glucose tolerance is advantageous in a subject susceptible to, or having diabetes mellitus, an advantage of increased glucose tolerance may be that the subject displays less or reduced diabetes related symptoms. This may further prevent or delay progression of diabetes mellitus, or prevent or delay onset of diabetes mellitus, or treat diabetes mellitus.

A subject may have an "increased glucose tolerance" when the subject has a blood glucose level 2 h after a 75 g load of glucose which is lower than the level of blood glucose 2 h after a 75 g load of glucose prior to or in the beginning of a treatment as described herein. As explained elsewhere herein, the level of blood glucose and/or the glucose tolerance may be measured using standard tests.

In one embodiment, administration of the HIF-1α inhibitor according to the present disclosure, may provide an improved pancreatic islet function in a subject. An advantage of an improved pancreatic islet function is that the subject may display fewer diabetes related symptoms, or less severe diabetes related symptoms. The pancreatic islet function may improve in the sense that beta cell collapse is prevented, and/or basal insulin secretion is restored, and/or insulin secretory index is increased. Any of these effects may further contribute to prevention of or delayed progression of diabetes mellitus, or prevention of or delayed onset of diabetes mellitus, or treatment of diabetes mellitus.

In one embodiment, use of the HIF-1α inhibitor according to any aspect of the present disclosure elevates the rate of beta-cell proliferation in pancreatic beta cells, as compared to in a non-treated subject. A non-treated subject should in this context thus be understood as a subject having the same symptoms but not receiving treatment with said inhibitor, or receiving placebo.

An advantage of increased rate of beta-cell proliferation in the pancreatic beta cells is that an amount of secreted insulin may rise, which in turn may lead to the subject experiencing or displaying less or reduced diabetes related symptoms. An increased rate of beta-cell proliferation in the pancreatic beta cells may further prevent or delay a progression of diabetes mellitus, or prevent or delay an onset of diabetes mellitus, or may treat diabetes mellitus.

In one embodiment, use of the HIF-1α inhibitor according to any aspect of the present disclosure, changes the phenotype of the pancreatic beta cells in the subject. In this way, a maintained or increased non-fasting plasma insulin (and/or c-peptide) level may be provided. A change in phenotype of the pancreatic beta cells may lead to that the beta cells produce and/or secrete more insulin. This may be due to elevated hyperplasia of the pancreatic beta cells. A change in phenotype of the pancreatic beta cells may therefore further prevent or delay a progression of diabetes mellitus, or prevent or delay an onset of diabetes mellitus, or may treat diabetes mellitus.

In one embodiment, by using the HIF-1α inhibitor according to any aspect of the present disclosure, a ratio of beta:alpha and/or beta:delta cells in the pancreas of the subject is elevated, as compared to the corresponding ratio in a non-treated subject. In other words, the level of beta cells in the pancreas is increased in relation to alpha and/or delta cells. In similarity with the effect associated with changed phenotype of pancreatic cells, an elevated ratio may provide for a higher insulin production and/or secretion. This may be associated with a lower amount of glucagon being produced and secreted by the cells. An elevated production and secretion of insulin is advantageous as disclosed elsewhere herein and may therefore further prevent or delay a progression of diabetes mellitus, or prevent or delay an onset of diabetes mellitus, or may treat diabetes mellitus.

An advantage of the present invention is that, one or more of the effects as disclosed herein may be obtained even if the treated subject is refractory to other treatments of improving insulin sensitivity.

In one embodiment, the subject may be unresponsive to one or more other treatments for improving insulin sensitivity. An unresponsiveness to one or more other treatments of improving insulin sensitivity may be due to, for example, mutations in ADIPOQ (adiponectin), mutations in LPIN2 (lipin 2), mutations in UCP1 (uncoupling protein 1) and/or mutations in ABCA1 (ATP-binding cassette transporter). Thus, it is contemplated that said inhibitor for use may improve non-fasting glucose levels even in a subject that is refractory to one or more of such other treatments for improving insulin sensitivity. It is hypothesized that such effects are seen because an HIF-1α inhibitor has direct impact on pancreatic beta cell function and contributes to the preservation of the compensatory mechanism counteracting insulin resistance.

Other treatments may be any treatment known to persons of skill in the art, and such other treatments should be understood as a treatment that may be used with the aim of improving insulin resistance in a subject in need thereof, or that may be used with the aim of preventing or delaying an onset of diabetes mellitus, or preventing or delaying a progression of diabetes mellitus, or may be used with the aim of treating diabetes mellitus. Examples of known treatments for improving insulin sensitivity include, but are not limited to, treatments with metformin which has been shown to reduce hepatic glucose production, and thiazolidenediones such as rosiglitazone and pioglitazone which have been shown to increase insulin sensitivity in adipose tissue, muscle and the liver. Such other treatments may have a varying efficacy in improving insulin sensitivity. In one specific embodiment, the subject is unresponsive to one or more other treatment of improving insulin sensitivity in adipose tissue.

According to one embodiment, said subject is selected from the group consisting of a human, a cat, a dog, a pig, a horse and a mouse. In particular embodiments, said subject is a human. In other embodiments, said subject is a mouse.

In a third aspect, there is provided a method of
a) preventing or delaying onset of diabetes mellitus,
b) preventing or delaying a progression of diabetes mellitus, and
c) treating diabetes mellitus
in a subject, wherein said subject is susceptible to or has diabetes mellitus, and
wherein said subject has one or more of elevated non-fasting blood glucose, elevated fasting blood glucose, impaired glucose tolerance and elevated hemoglobin A1c levels, the method comprising administration of a HIF-1α inhibitor to said subject, thereby maintaining or providing increased non-fasting plasma insulin levels in said subject.

The subject may also have decreased plasma insulin and/or c-peptide levels. Thus, the administration of a HIF-1α inhibitor to said subject, may maintain or provide increased non-fasting plasma insulin and/or c-peptide levels in said subject. In one embodiment, the subject have decreased plasma insulin and/or c-peptide levels and the administration of a HIF-1α inhibitor to said subject maintains or provides increased non-fasting plasma insulin and c-peptide levels in said subject.

It should be understood that specific embodiments disclosed in relation to the second aspect are equally relevant, when applicable, to the first and third aspects of the invention.

Exemplifying embodiments will now be described more fully hereinafter with reference to the accompanying drawings. The invention may, however, be embodied in many different forms and should not be construed as limited to the embodiments set forth herein.

BRIEF DESCRIPTION OF THE DRAWINGS

FIG. 1C shows HIF-1ca protein levels after treatment with a glucokinase activator by picturing SDS-gels stained with a HIF-1α antibody.

FIG. 1 D-F illustrates insulin release, secretory index and insulin content of isolated pancreatic islets treated with GKA50 in the presence or absence of PX-478.

FIG. 3A shows the schematic representation of the treatment. 3B shows that the bpdy weight is not affected in db/db treated with a PX-478. 3C shows the prevention of non-fasting blood glucose raise in db/db treated with a PX-478. FIG. 3 D illustrates the sustaining of plasma insulin levels in db/db mice treated with a PX-478.

FIG. 7A shows the schematic representation of the treatment. 7B shows that the bpdy weight is not affected in db/db treated with a PX-478. 7C shows the prevention of non-fasting blood glucose raise in db/db treated with a PX-478. FIG. 7D illustrates the sustaining of plasma insulin levels in db/db mice treated with a PX-478

FIG. 9A shows the schematic representation of the treatment. 9B shows that the bpdy weight is not affected in db/db treated with a PX-478. 9C illustrates that non-fasting blood glucose decreases in STZ-induced diabetic mice treated with a PX-478. 9D shows that non-fasting plasma insulin presents a tendency to increase in STZ-induced diabetic mice treated with a PX-478.

DETAILED DESCRIPTION

Figure 1:
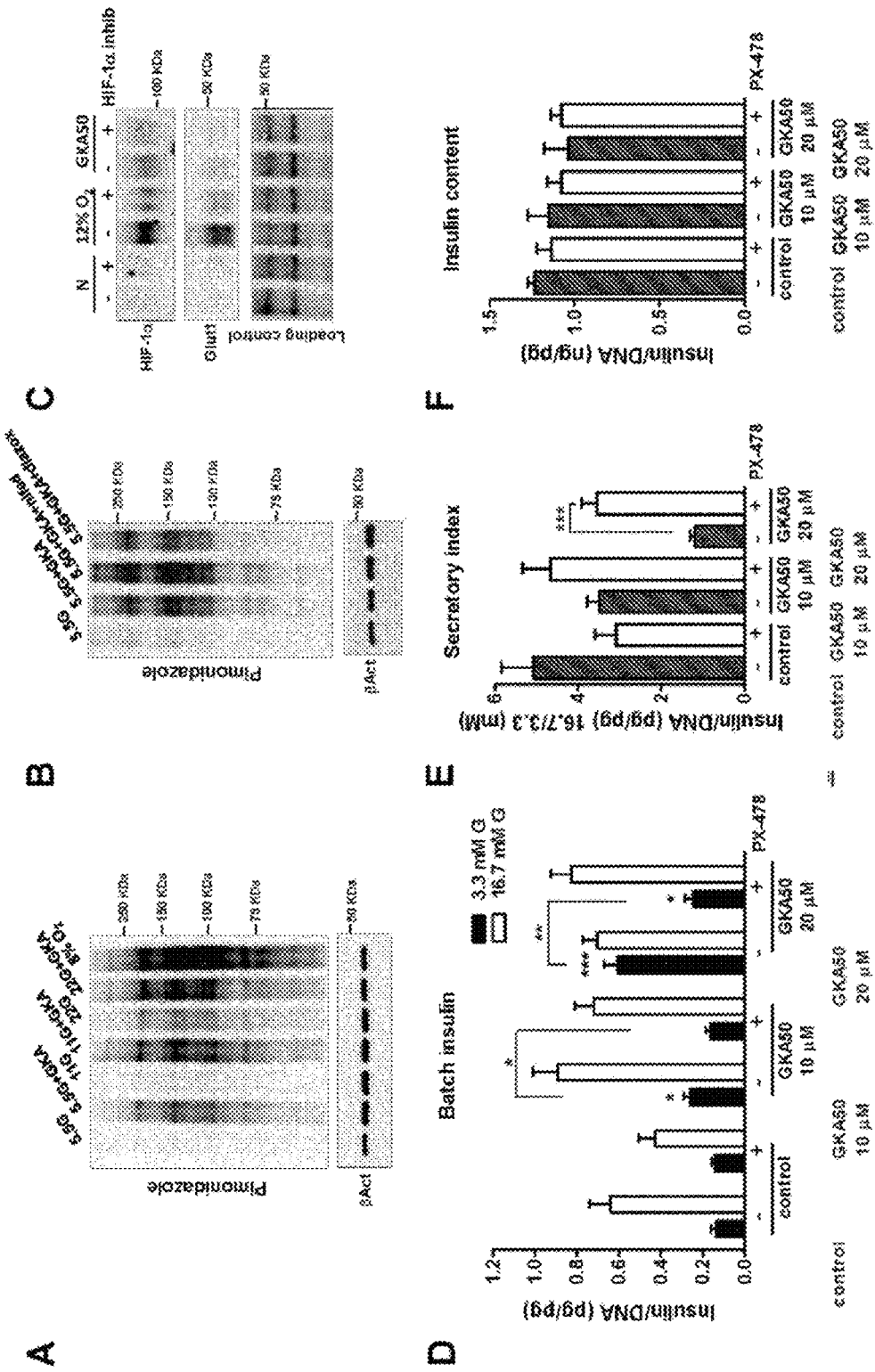
FIG. 1 A-B illustrates hypoxia levels after treatment with a glucokinase inhibitor (GKA50) by picturing SDS-gels with the hypoxia-specific dye pimonidazole.

In the second aspect of the present invention, there is provided a HIF-1α inhibitor for use in preventing or delaying an onset of diabetes mellitus, preventing or delaying a progression of diabetes mellitus, or in treating diabetes mellitus in a subject. The subject may be susceptible to or may have diabetes mellitus, and the subject may have elevated non-fasting blood glucose, and/or elevated fasting blood glucose, and/or impaired glucose tolerance and/or elevated hemoglobin A1c levels.

In one embodiment, a subject with diabetes mellitus may be identified and/or clinically diagnosed by a fasting blood glucose concentration of greater than or equal to 126 mg/dL (7.0 mmol/L), or a blood glucose concentration of greater than or equal to 200 mg/dL (11.1 mmol/L) at about two hours after an oral glucose tolerance test (OGTT) with a 75 g load, or in a patient with classic symptoms of hyperglycemia or hyperglycemic crisis, a random blood glucose concentration of greater than or equal to 200 mg/dL (11.1 mmol/L), or HbAlc levels of greater than or equal to 6.5%. Reference is made to Standards of Medical Care in Diabetes-2010 (American Diabetes Association, Diabetes Care 33:SII-61, 2010), wherein a more detailed description of diabetes may be found.

In one embodiment, a prediabetic subject, i.e. a subject with pre-diabetes, may be diagnosed by impaired glucose tolerance (IGT). An OGTT two-hour blood glucose of greater than or equal to 140 mg/dL and less than 200 mg/dL (7.8-11.0 mmol/L), or a fasting plasma glucose (FPG) concentration of greater than or equal to 100 mg/dL and less than or equal to 125 mg/dL (5.6-6.9 mmol/L), or HbA1c levels of greater than or equal to 5.7% and less than or equal to 6.4% (5.7-6.4%) is considered to be IGT, and may indicate that a subject has prediabetes.

Due to the high energetic demands of insulin secretion, pancreatic beta cells consume large amounts of oxygen in mitochondrial respiration. The dependence of beta cell function on high levels of oxygen has previously been highlighted in two studies showing that exposure of beta cells to high glucose levels leads to a cellular hypoxic phenotype with activation of the HIF-1α (Sato et al., 2011; Bensellam et al., 2012). This hypoxic phenotype was proposed to result from high levels of oxygen consumption due to mitochondrial respiration and ATP production needed for insulin secretion.

It is shown in the appended Examples that the hypoxic phenotype (FIGS. 1A, B and C) resulting from the necessity of secreting high levels of insulin have a negative impact on beta cell function (FIG. 1D), resulting in a deregulated secretion of insulin. In contrast with these observations, preventing the establishment of a hypoxic phenotype by inhibiting HIF-1α activity improve beta cell function by restoring glucose-dependent secretion of insulin with the consequent improvement of the secretory index (FIG. 1E). The diabetic mouse model used presents high levels of insulin resistance as illustrated by its hyperinsulinemic state (FIG. 3D) implying that pancreatic beta cells are subject to high workload and can become hypoxic and dysfunctional. Inhibition of HIF-1α show to preserve beta ability to secrete the amount of insulin necessary to compensate for the insulin resistance.

The aspects of the present invention provide use of a HIF-1α inhibitor, i.e. an inhibitor of a Hypoxia-Inducible Factor (HIF). Adaptation of organisms to low oxygen levels (hypoxia) is a fundamental biological process that is required in both physiological and patho-physiological situations. In response to hypoxia the HIFs activate transcription of a large group of genes encoding proteins involved in angiogenesis (VEGF), erythropoiesis (erythropoietin) and glucose metabolism (glycolytic enzymes and glucose transporters) (Semenza, 2012). The HIF-1 transcription factor complex is a heterodimer formed by a constitutively expressed protein, Arnt, and the oxygen-regulated factor, HIF-1α The activity of HIF-1α protein is mainly regulated at the level of protein stability. At normoxia, HIF-1α is targeted for degradation by the von Hippel-Lindau tumor suppressor protein (pVHL) acting as an E3 ubiquitin ligase (Cockman et al., 2000; Ohh et al., 2000; Tanimoto et al., 2004). Since binding of pVHL to HIF-1α is dependent on the hydroxylation of specific proline residues by $O_2$-dependent prolyl 4-hydroxylases (Kaelin and Ratcliffe, 20085), exposure to hypoxia results in the stabilization of HIF-1α proteins.

FIG. 1 illustrates that high levels of glucose metabolism lead to cellular hypoxia in isolated pancreatic islets and shows the impact of such treatment on insulin release.

FIGS. 1A and B exemplify treatment of isolated pancreatic islets with 5.5-22 mM glucose and/or treatment with the glucokinase activator GKA50. Also treatment with 5.5 mM glucose, GKA50 and the calcium channel inhibitor or potassium channel activators nifedipine and diaxozide, respectively, are exemplified, both known impair or aborgate insulin secretion. All treated islets were subsequently subjected to a hypoxia specific dye. It was found that high levels of glucose metabolism lead to cellular hypoxia and that insulin secretion is not required to cellular hypoxia establishment.

FIG. 1C exemplifies treatment of isolated pancreatic islets with GKA50 or 12% $O_2$, with or without treatment with an HIF-1α inhibitor. It was found that high glucose metabolism, as well as incubation at 12% $O_2$, leads to activation of HIF-1a, and that addition of a HIF-1α inhibitor suppressed these results. FIGS. 1D, E and F illustrate insulin release, secretory index and content of isolated pancreatic islets treated with GKA50 in the presence or absence of an HIF-1α inhibitor. After treatment the cells were fasted for 2 hours. It was found that GKA50 lead to increased basal insulin secretion but did not impact insulin release when glucose concentration was high. An HIF-1α inhibitor decreased the basal insulin secretion with consequent upregulation of the secretory index. None of the treatments influenced insulin content. These results indicate that stabilization and activation of HIF-1α due to high glucose metabolism contributes to deregulation of insulin secretion in response to glucose, and it may therefore be hypothesized that inhibition of HIF-1α is able to restore basal insulin secretion levels.

Figure 3:
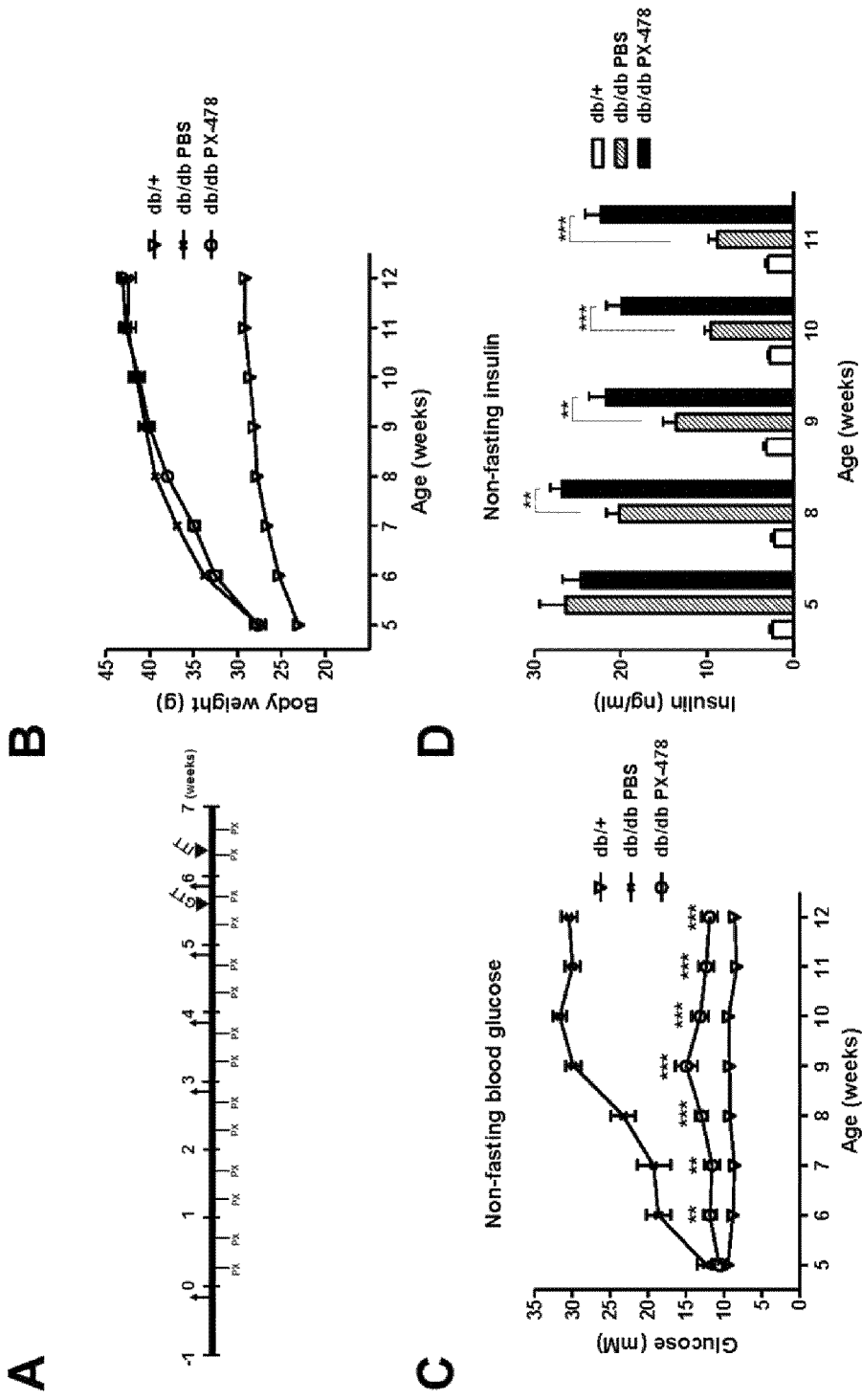
FIG. 3 illustrates HIF-1α inhibition on diabetes progression in db/db mice treated with a PX-478.

FIG. 3 illustrates the impact of HIF-1α inhibition on the progression of diabetes following an example treatment according to the present disclosure. In this example, a subject having diabetes type II before starting the treatment was administered said inhibitor. The inhibitor was administrated twice a week for 7 weeks at a dose of 30 mg per kg of bodyweight (6-8 weeks of age) or 40 mg per kg of bodyweight (9-12 weeks of age).

It was found that use of the HIF-1α inhibitor at this dose did not influence the body weight during the course of the treatment. It may be hypothesized that the lack of reduction of body weight as seen in FIG. 3B, may be a result of the inhibitor targeting the pancreatic beta cells in a subject, and not adipose tissue. In other words, with the dose used, an effect of the use of the HIF-1α inhibitor according to the present disclosure may result in an effect in pancreatic beta cells, but not in adipose tissue in a subject. The use of the HIF-1α inhibitor in accordance with this example did suppress the non-fasting blood glucose. This effect was seen 5 days after the first administration of the inhibitor, and the non-fasting blood glucose values stayed stable at levels comparable to a non-diabetic subject during the whole course of the experiment.

As known by persons of skill in the art, beta cell compensation for insulin resistance in early progression of diabetes mellitus type II may elevate the level of insulin secretion. This compensation may be illustrated in FIG. 3D, where subjects part of the diabetic model did display increased non-fasting insulin at 5 weeks of age. With time, the beta cells are not able to keep up at this level of insulin production, and get exhausted, and the level of insulin decreases. It has surprisingly been found that for subjects treated with the HIF-1α inhibitor, the compensatory effect did remain and that the subjects remained hyperinsulinemic until the end of the experiment. It is possible that using the HIF-1α inhibitor in accordance with the present disclosure, may provide for an ability of the beta cells to continue to secrete high levels of insulin. Therefore, these examples demonstrate that use of a HIF-1α inhibitor such as PX-478 may prevent or delay the onset or progression of diabetes.

Figure 4:
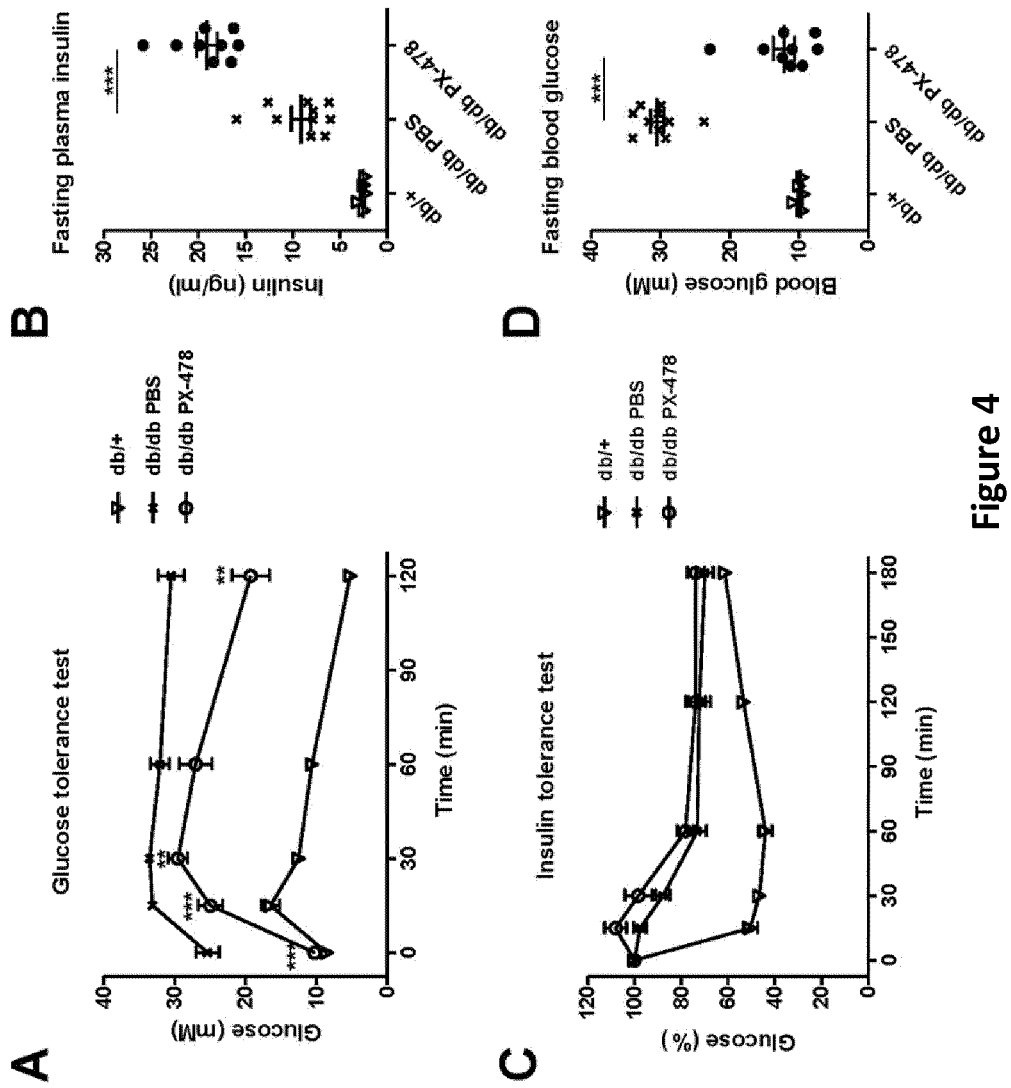
FIG. 4 shows results from glucose and insulin tolerance tests of db/db mice treated with PX-478.

FIG. 4 illustrates the metabolic state of subjects in accordance with one example treatment. In this example, the subject had diabetes type II before starting the treatment. The inhibitor was administered twice a week for 6-7 weeks. It is shown in this example, that treatment of a diabetic subject treated with a HIF-1α inhibitor resulted in improved tolerance to glucose without improvement of peripheric insulin sensitivity. After fasting for 6 hours the same subjects showed elevated plasma insulin levels and lowered blood glucose levels. It is hypothesized that the improved tolerance to glucose is a consequence of elevated levels of plasma insulin and that the improved response of the subject is due to the use of the inhibitor in accordance with the present disclosure provides ability of beta cells to produce high amounts of insulin as a compensatory mechanism to counteract insulin resistance.

Figure 5:
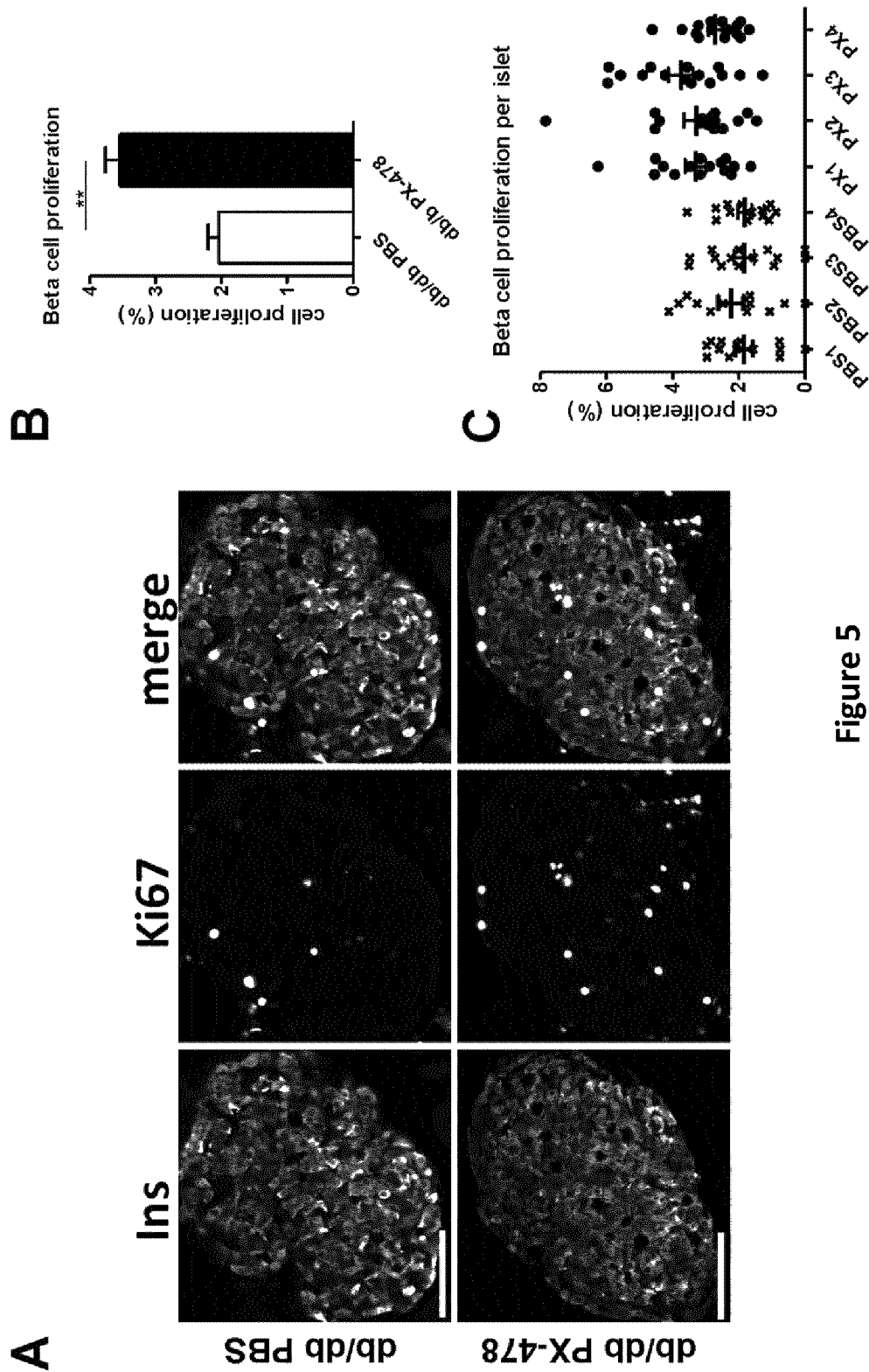
FIG. 5 shows proliferation levels of beta cells in db/db mice treated with PX-478 as visualized by Ki67 staining.
Figure 6:
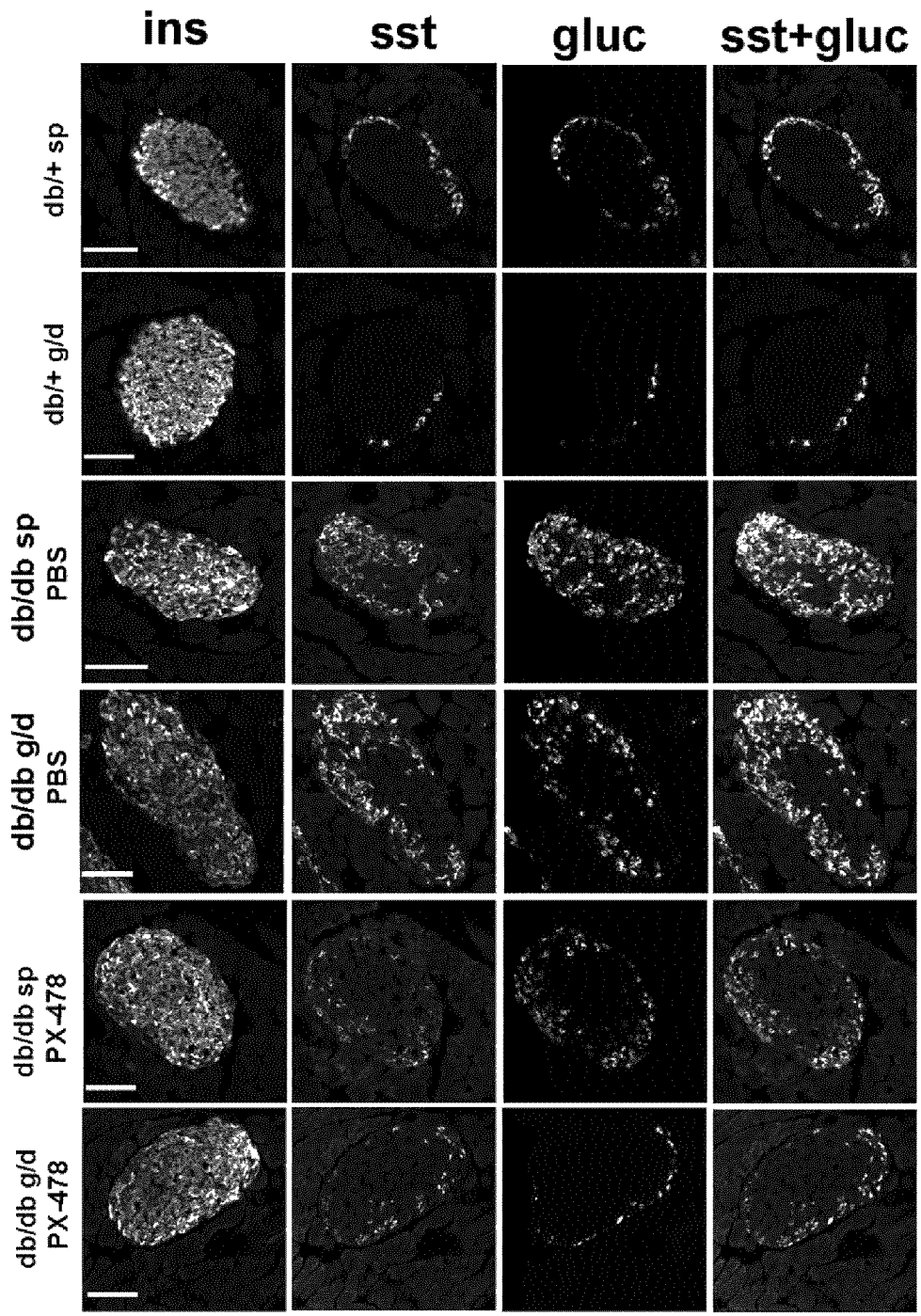
FIG. 6 illustrates the architecture of the islets in db/db mice treated with PX-478 as visualized by staining of distinct endocrine cells.

FIGS. 5 and 6 illustrate the results of an example treatment according to the invention, in which the proliferation levels of pancreatic beta cells in a subject has been investigated after treatment. In this example, the subject had diabetes type II before starting the treatment and the treatment comprised administration of the inhibitor twice a week for 7 weeks. As FIG. 5 demonstrates, treatment with the HIF-1α inhibitor resulted in a higher rate of proliferation in beta cells. It is hypothesized that the higher proliferation rate seen can contribute to increased functional beta cell mass and higher levels of insulin secretion, and may prevent or may delay a progression of diabetes in a subject.

A change in islet architecture is observed in several mouse models of diabetes. FIG. 6 illustrates that the ratio of beta/alpha and beta/delta cells in the pancreas in treated mice is higher in treated mice than in non-treated mice. Treatment of mice with PX-478 reduced the number of glucagon and somatostatin-producing cells in db/db mice indicating that the HIF-1α inhibitor increases the islet ratio of beta to alpha and beta to delta cells leading to islet architecture more similar to the one present in control animals.

Figure 7:
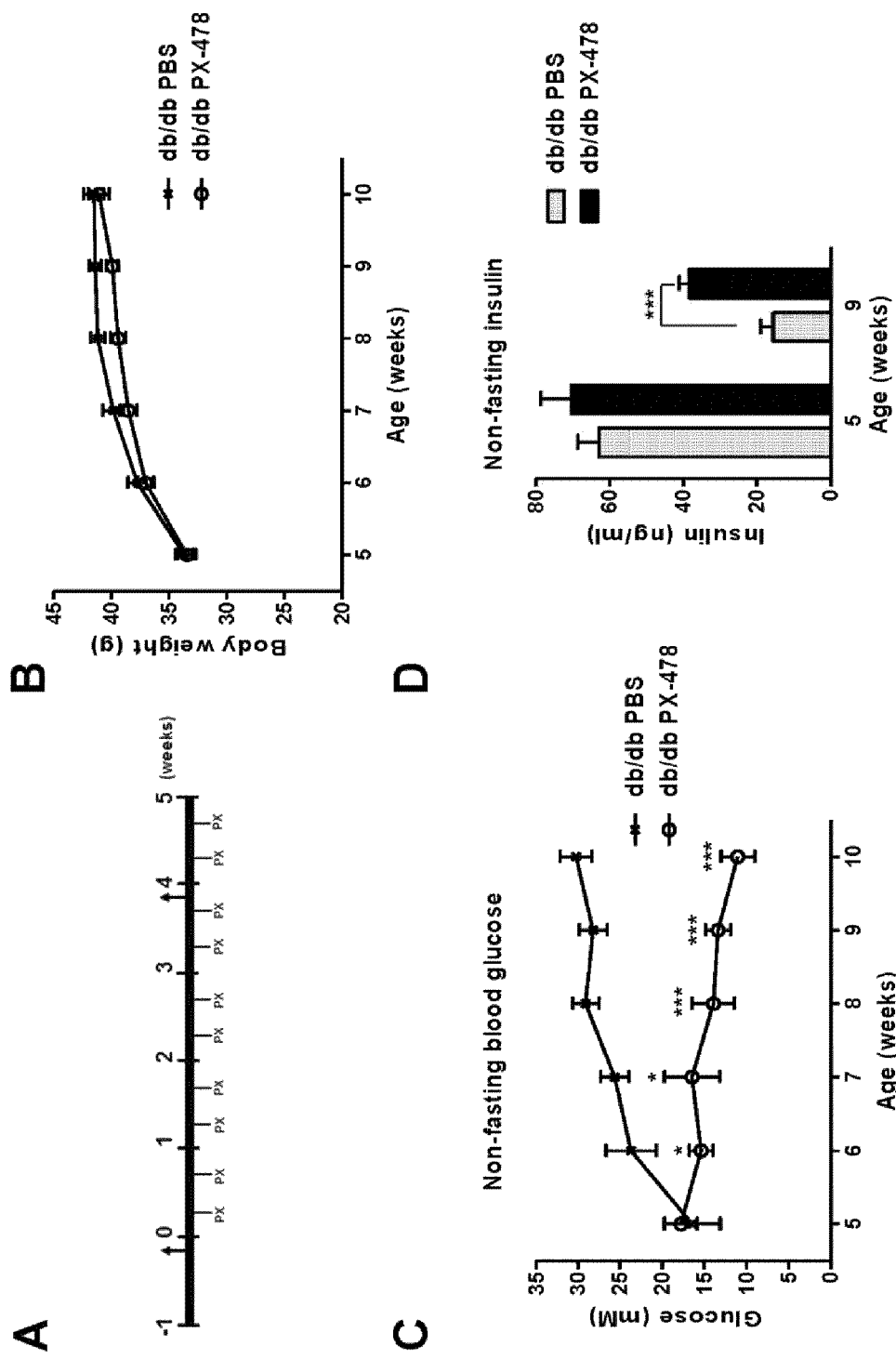
FIG. 7 illustrates HIF-1α inhibition on diabetes progression on db/db mice already hyperglycemic at the age of 5 weeks old, treated with a PX-478.

FIG. 7 illustrates the impact of HIF-1α inhibition on the progression of diabetes. In this example, the subject is a mouse suffering from severe diabetes type II before the treatment started. The inhibitor was administered to the subject twice a week. The use of the HIF-1α inhibitor in accordance with this example did not influence the body weight during the course of the experiment. However, blood glucose was decreased in a time dependent manner and plasma insulin levels of the treated animals were higher than the non-treated animals. This example shows that treatment with a HIF-1α inhibitor does not only prevent or delay the onset of diabetes, but it is also able to revert overt diabetes.

Figure 8:
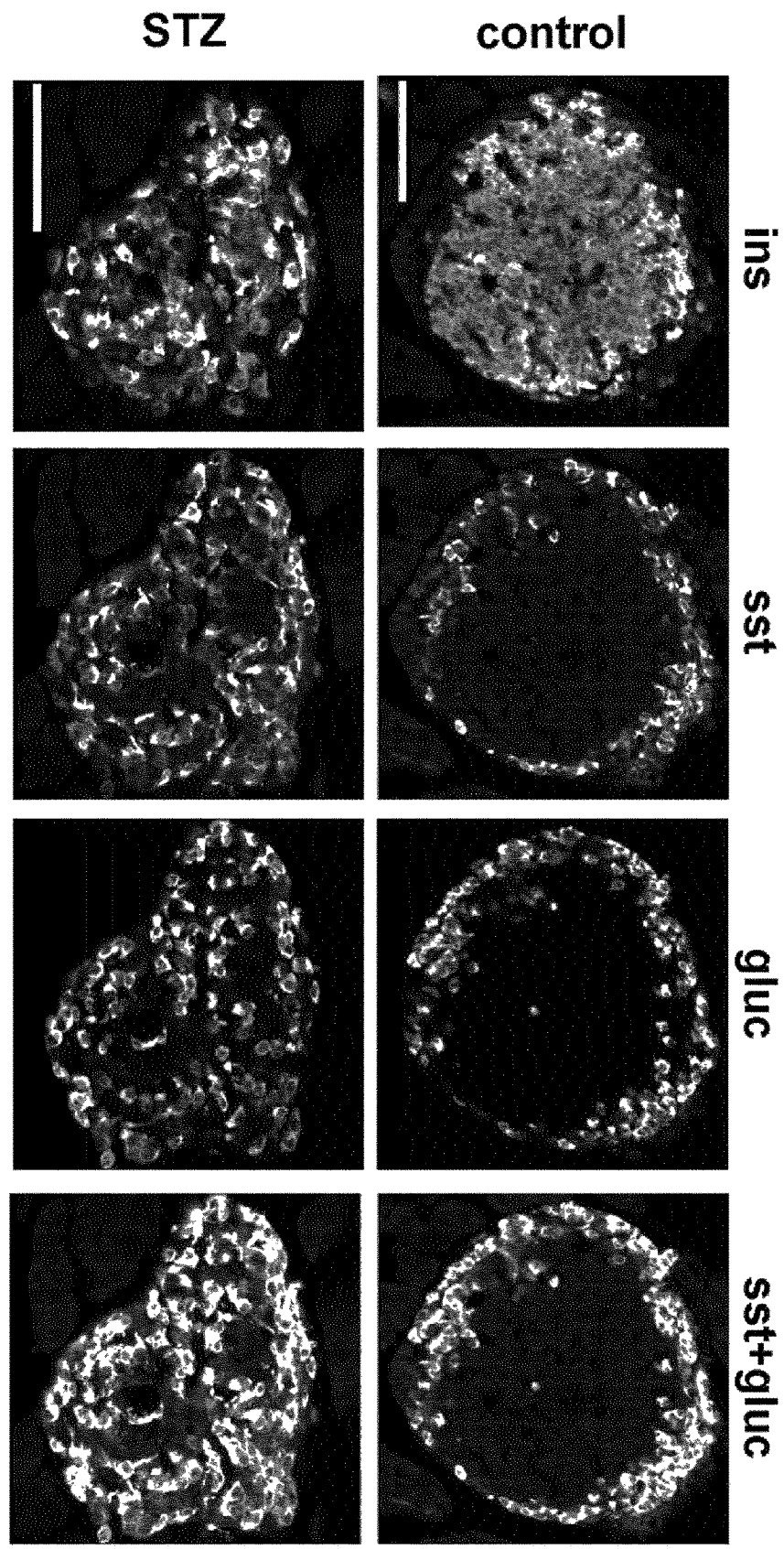
FIG. 8 shows pancreatic islets of STZ-treated mice.

FIG. 8 shows pancreatic islets of mice treated with streptozotocin (STZ), a compound with preferential toxicity towards beta cells. As can be seen on this Figure, the islets contain beta cells. STZ treatment of mice is used as a model for type I diabetes mellitus. In this example, the subject is a mouse that was administered STZ at a low dose, resulting in a partially ablated beta cell number, as shown in the Figure.

Figure 9:
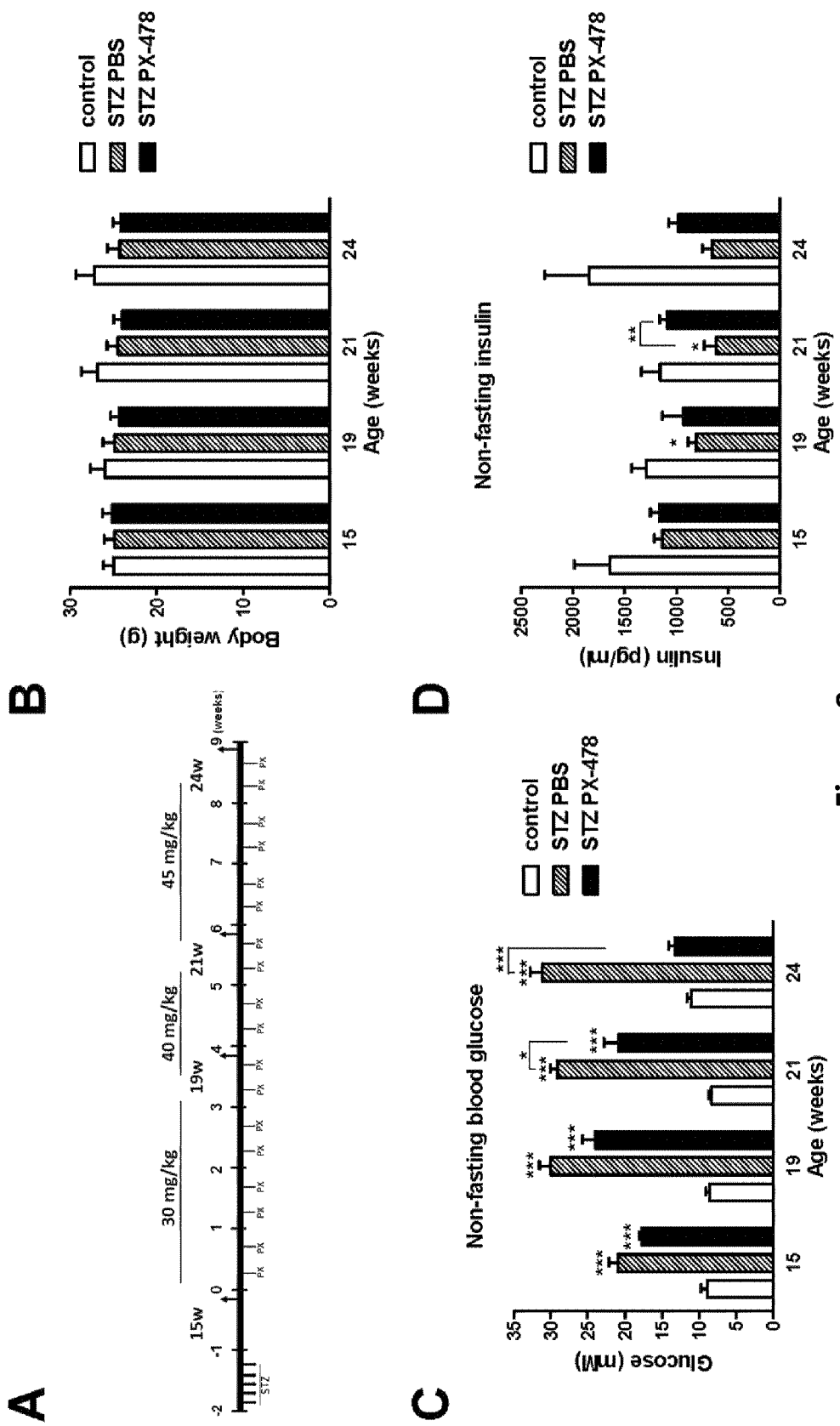
FIG. 9 illustrates HIF-1α inhibition on diabetes progression on STZ-treated mice, treated with a PX-478.

FIG. 9 illustrates the impact of HIF-1α inhibition on the progression of diabetes. In this example, the subject was a mouse according to the embodiment of FIG. 8. In this example, the subject has reduced beta cell mass and normal insulin sensitivity and was administrated the inhibitor twice a week. The use of the HIF-1α inhibitor did not influence the body weight during the course of the experiment but it did decrease blood glucose concentration with a concomitant increase of plasma insulin concentration. Treatment with the HIF-1α inhibitor according to this example may therefore improve the level of non-fasting blood glucose. It is therefore hypothesized that the HIF-1α inhibitor has a positive impact on delaying a progression of diabetes type 1.

Figure 12:
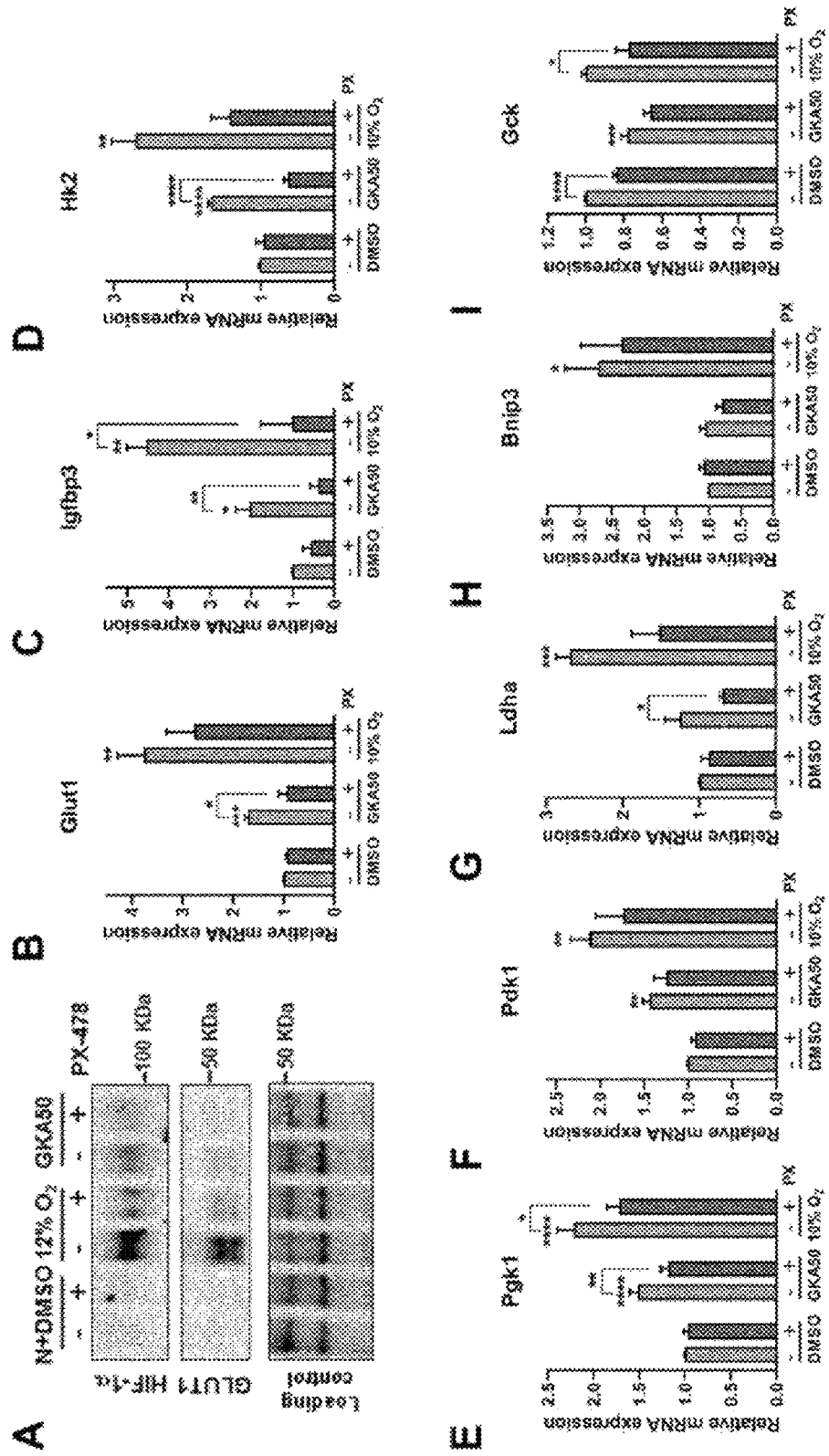
FIG. 12A shows HIF-1□ protein levels after treatment with a glucokinase activator by picturing SDS-gels stained with a HIF-1α antibody.
FIG. 12B-I illustrates gene expression of HIF-1α target genes Glut1 (B)), lgfbp3 (C), Hk2 (D), Pgk1 (E), Pdk1 (F), Ldha (G), and Bnip3 (H) in isolated pancreatic islets treated with GKA50 in the presence or absence of PX-478.

As shown in FIG. 12, increase in GCK activity leads to stabilization of HIF-1α and upregulation of HIF-1α target genes. Gene expression of HIF-1α-target genes Glut1 (B), Igfbp3 (C), Hk2 (D), Pgk1 (E), Pdk1 (F), Ldha (G), and Bnip3 (H) was analyzed by RT-qPCR and these results demonstrate that high glucose metabolism leads to stabilization and activation of HIF-1α and upregulation of expression of several HIF-1α-target genes.

EXAMPLES

Materials and Methods
Animal Models and Treatments

All mice were housed in a temperature- and humidity-controlled room with 12 hours light/dark cycles with food and water ad libitum. Animal care and experimentations were carried out according to the Animal Experiment Ethics Committee at Karolinska Institutet. Blood glucose concentration in mice were obtained using Accu-Chek Aviva monitoring system (Roche) which allows readings up to a maximum of 34.0 mM of glucose. Higher values were considered 34.0 mM. Male C57BL/6J mice as well as BKS.Cg-Dock7$^m$+/+ Lepr$^{db}$/J (db/db) and their normoglycemic heterozygous controls (db/+) were purchased from Charles River Laboratories (Germany and Italy, respectively). C57BL/6J mice rendered diabetic by treatment with streptozotocin were treated by intraperitoneal injection (IP) daily during 5 consecutive days with the toxin at a concentration of 50 mg per kg of body weight. The blood glucose and body weight was monitored daily after the first streptozotocin IP. Six weeks old db/db mice were treated twice a week up to the age of 12 weeks with the HIF-1α inhibitor PX-478 (Cayman Chemical company) (FIGS. 3, 4 and 5). The mice were fed with wet food (chow) 2 hours before treatment. A solution of PX-478 in PBS pH 7.2 was delivered by IP at a concentration of 30 mg per kg of bodyweight (6-8 weeks of age) or 40 mg per kg of bodyweight (9-12 weeks of age). db/db mice (n=9) received the IP injection during a period of 30 min after PX-478 were dissolved in PBS. db/+(n=5) received PBS as well as non-treated db/db mice (n=10). Another cohort of db/db mice were treated with PX-478 (n=6) at concentration of 40 mg per kg of body weight or injected with PBS (n=5) up to 10 weeks of age (FIG. 7). C57BL/6J mice rendered diabetic by streptozotocin were treated with PX-478 (n=5) as indicated in the scheme in FIG. 8A or injected with PBS (n=3). A streptozotocin control group of C57BL/6J (n=4) was also injected with PBS. Plasma insulin was measured by collecting blood from the mouse tail into EDTA coated micro-cuvettes following centrifugation. Insulin was measured by AlfaLISA according to manufacturer instructions.

Islet isolation (used in Examples 3 and 4, relating to FIGS. 1 and 2) Mice were sacrificed by cervical dislocation and their pancreas perfused with 5 ml of 1 mg/ml collagenase P (Roche, USA) in Hank's balance salt solution (HBSS) (Sigma, Sweden) buffered with HEPES (pH 7.4) supplemented with 0.25% bovine serum albumin (BSA). Pancreata were thereafter extracted and digested in a water bath at 37° C. for 28 min. Islets were handpicked in ice-cold HBSS buffered with HEPES (pH 7.4) containing 0.5% BSA. Prior to in vitro experimentations, islets were cultured overnight in RPMI 1540 medium supplemented with 10% fetal calf serum (FCS), L-glutamine (2 mM), penicillin (100 U/ml) and streptomycin (100 U/ml) (Life Technologies).

Figure 2:
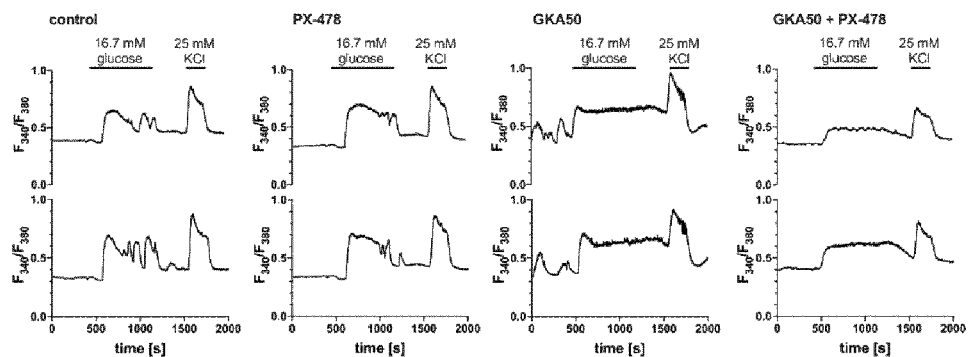
FIG. 2 illustrates how hyper metabolism affects $Ca^{2+}$ handling, showing measurements of cytoplasmic free $Ca^{2+}$-concentration in isolated pancreatic islets after induction of increased glucose metabolism.
Figure 2:
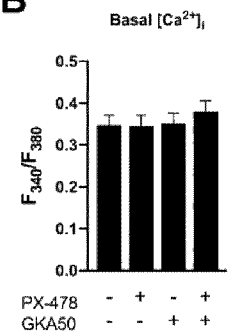
Figure 2:
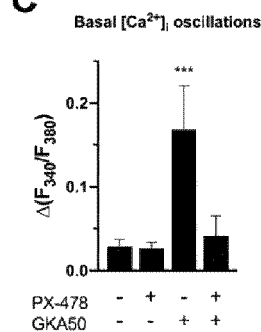
Figure 2:
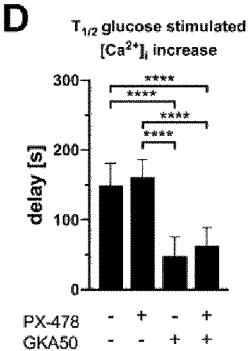
Figure 2:
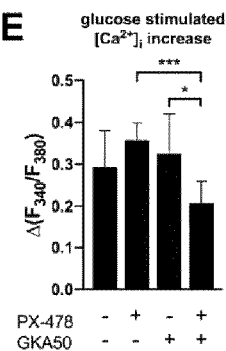
Figure 2:
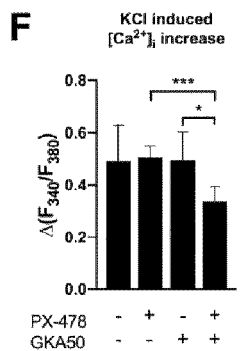
Figure 2:
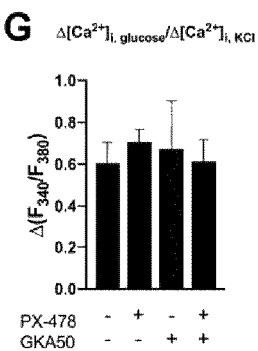

Treatment of islets of Langerhans (used in Examples 3 and 4, relating to FIGS. 1 and 2)

For experiments using the hypoxic marker pimonidazole, islets were cultured overnight in RPMI 1640 with 11 mM glucose and fasted for 1 hour in RPMI 1640 with 5.5 mM glucose. Subsequently islets were moved to medium containing 5.5 mM, 11 mM or 22 mM glucose, either with or without the glucokinase activator 10 µM of the glucokinase activator GKA50 (Sigma), 50 µM nifedipine (Sigma) or 100 µM diaxozide (Sigma) as indicated (FIGS. 1A and B). Islets were cultured during 8 hours before lysis. During the last 2 hours pimonidazole (Hypoxyprobe, HPI, Inc) was added to the medium. The hypoxic sample were cultured under 8% $O_2$ during the last 2 hours before the lysis.

In the experiments performed to detect HIF-1α, static batch incubation and measurement of cytoplasmic free $Ca^{2+}$-concentration isolated islets were cultured for 18-24 hours in RPMI medium with 11 mM glucose and then fasted 1-2 hours at 5.5 mM glucose. After the fasting period, islets were kept in RPMI medium with 11 mM glucose and treated for 20 hours with 10 µM or 20 µM GKA50 (Sigma) or exposed to 12% $O_2$ in the presence or absence of 50 µM PX-478, as indicated (FIG. 1C, D).

Protein Extraction and Immunoblotting Assays

Islets were sonicated in RIPA buffer (50 mM Tris-HCl pH7.4, 150 mM NaCl, 1% NP-40, 0.5% Na deoxycholate, 0.1% SDS, 1 mM EDTA, protease inhibitor mix (Complete-Mini, Roche), 0.5 mM phenylmethylsulfonyl fluoride (PMSF) and 0.5 mM dithiothreitol). Lysates were cleared by centrifugation for 30 min at 14.000 r.p.m., and proteins were separated by SDS-PAGE and blotted onto nitrocellulose membranes. Blocking was performed at room temperature for 2 h in TBS buffer (50 mM Tris-HCl pH7.4 and 150 mM NaCl) with 5% nonfat milk, followed by incubation with primary antibodies of anti-rabbit pimonidazole (1:500, PAb2627(AP), Hypoxyprobe, HPI Inc.) or anti-mouse HIF-1α (1:200, NB100-449, Novus Biologicals) in TBS with 2% nonfat milk overnight at 4° C. After several washes with TBS containing 0.5% Tween 20, the membranes were incubated with the secondary antibody anti-rabbit IgG/HRP (Cell Signalling Technology) in TBS with 1% nonfat milk. Following several washes, proteins were visualized using chemiluminescence (GE Healthcare or Biorad) according to the manufacturer's instructions.

Static batch incubation (insulin secretion) (used in Example 3, relating to FIGS. 1D, E and F)

For measurement of insulin release groups of 6 islets were first fasted for 2 h at 37° C. in Krebs buffer (pH7.2, 126 mM NaCl, 2.5 mM KCl, 25 mM $NaHCO_3$, 1.2 mM $NaH_2PO_4$, 1.2 mM $MgCl_2$, 2.5 mM $CaCl_2$ and 0.1% BSA) containing 3.3 mM glucose. Insulin release was measured from islets incubated for 1 h at 3.3 mM glucose and subsequently 1 h at 16.7 mM glucose. Insulin concentration was assessed by AlphaLISA (Perkin Elmer) and insulin content was measured from islets lysed in M-PER extraction buffer ((Thermo Fisher Scientific). DNA content was measured by QuantIT Picogreen dsDNA kit (Thermo Fisher Scientific).

Measurements of cytoplasmic free $Ca^{2+}$*-concentration (used in Example 4, relating to FIG. 2)

Changes in cytoplasmic free $Ca^{2+}$ ($[Ca^{2+}]_i$) were recorded in islets treated with 20 µM GKA50 and co-treated with or without 50 µM PX-478. After 20 hours of treatment islets were fasted for 2 hours in perifusion buffer (pH7.4, containing 125 mM NaCl, 5.9 mM KCl, 2.6 mM $CaCl_2$, 1.2 mM $MgCl_2$, 25 mM HEPES, and 0.1% BSA) with 3 mM glucose and during the last hour of fasting islets were loaded with 2 mM Fura-2AM (Thermo Fisher Scientific). Cytoplasmic free $Ca^{2+}$ measurements were performed by attaching islets to a cover slip using PuraMatrix Hydrogel (BD Biosciences) and fluorescence was recorded using an inverted epifluorescence Axiovert 135 microscope (Zeiss, Jena, Germany) connected to a SPEX Industries Fluorolog spectrofluorometer for dual-wavelength excitation fluorimetry. Islets were perifused at 37° C. with buffer supplemented with either 3 mM glucose, 16.7 mM glucose or 3 mM glucose+25 mM KCl, and simultaneously excited at 340 and 380 nm. Fluorescence emission was recorded and the ratio of intensities obtained by these two excitation wavelengths was calculated for normalization.

Glucose and insulin tolerance test (used in Example 6, relating to FIG. 4) Mice were fasted for 6 hours prior glucose or insulin tolerance test (GTT or ITT). For the GTT, mice receive an IP of 1.5 g glucose per kg bodyweight. For the ITT, mice receive by IP 0.5 U insulin per kg bodyweight. Blood glucose was measure at fixed time points up to 150 min post injection, as indicated.

Frozen sections and Immunocytochemistry (used in Example 7, relating to FIGS. 5, 6 and 8)

Anesthetized mice were perfused through the heart left ventricle with ice cold PBS supplemented with 3000 IE/ml heparin and subsequently with ice cold 4% paraformaldehyde (PFA). The pancreas was removed and kept at 4° C. during 5 hours in PFA. The pancreas was then moved to 30% sucrose and kept at 4° C. overnight after which was frozen and maintained at −80° C. Frozen pancreas was sliced at 20 µM thickness sections. Pancreatic sections were blocked in a TBS buffer containing 0.1% triton and supplemented with 10% FBS. Primary antibodies, rat anti-mouse Ki67 antibody (1:100) (Thermo Fisher Scientific) and guinea pig anti-mouse insulin antibody (1:1000) (DAKO) mouse anti-glucagon (1:1000) (Sigma), rat anti-human somatostoatin (1:700) (Biorad) and secondary antibodies goat anti-rat Alexa 546 (1:500), goat anti-guinea pig Alexa 633 (1:500), goat anti-mouse Alexa 546 (1:500) and goat anti-rat Alexa 488 (1:500) (Thermo Fisher Scientific) were incubated at 4° C. overnight in the buffer containing 0.1% triton. Frozen sections were further mounted with ProLong Gold Antifade with DAPI (Thermo Fisher Scientific). Images were acquired using a Leica SP5 system confocal microscope system (Leica Microsystems, Wetzlar, Germany). For proliferation studies n=11-16 islets per mouse were imaged and used in the quantification.

Gene Expression Analysis

Total RNA was isolated from frozen tissues using the TRI reagent according to the manufacturer's instructions, DNase-treated, and reverse transcribed using the High Capacity RNA- to cDNA Kit (Applied Biosystems). Gene expression was analyzed using Applied Biosystems' Power SYBR Green PCR Master Mix and ViiA 7 Real-Time PCR system. Gene expression was normalized to hypoxanthine phosphoribosyltransferase (Hprt) expression and expressed relative to experimental controls. Primer sequences are listed in the table below.

Genes Analyzed by qRTPCR:
CD14=CD14, CD14 molecule
IL1B=IL1B, Interleukin 1 Beta
MCP1=CCL2, C-C Motif Chemokine Ligand 2
TNF=TNF, Tumor Necrosis Factor
ATGL=PNPLA2, Patatin Like Phospholipase Domain Containing 2
HSL=LIPE, Lipase E, Hormone Sensitive Type PLIN1=PLIN1, Perilipin 1
FASN=FASN, Fatty Acid Synthase
SCD1=SCD, Stearoyl-CoA Desaturase
PPARG=PPARG, Peroxisome Proliferator Activated Receptor Gamma
CD68=CD68, CD68 Molecule
EMR1 (F4/80)=ADGRE1, Adhesion G Protein-Coupled Receptor E1
ACC1=ACACA, Acetyl-CoA Carboxylase Alpha
UCP1=UCP1, Uncoupling Protein 1
DGAT1=DGAT1, Diacylglycerol O-Acyltransferase 1
DGAT2=DGAT2, Diacylglycerol O-Acyltransferase 2
SREBP1c=SREBF1, Sterol Regulatory Element Binding Transcription Factor 1
AGPAT1=AGPAT1, 1-Acylglycerol-3-Phosphate O-Acyltransferase 1
PGC-1a=PPARGC1A, Peroxisome Proliferator Activated Receptor Gamma Coactivator 1 Alpha
PRDM16=PRDM16, PR/SET Domain 16
CD36=CD36, CD36 Molecule
PPARA=PPARA, Peroxisome Proliferator Activated Receptor Alpha
ACADM=ACADM, Acyl-CoA Dehydrogenase Medium Chain
ACADVL=ACADVL, Acyl-CoA Dehydrogenase Very Long Chain
ACOX1=ACOX1, Acyl-CoA Oxidase 1
PDK4=PDK4, Pyruvate Dehydrogenase Kinase 4
GLUT4=SLC2A4, Solute Carrier Family 2 Member 4
GLUT1
IGFBP3=Insulin-like growth factor-binding protein 3
HK2=Hexokinase 2
PGK1=Phosphoglycerate kinase 1
PDK1=Pyruvate Dehydrogenase Kinase 1
LDHA=Lactate Dehydrogenase A
BNIP3=BCL2-interacting protein 3
GCK=glucokinase Image Analysis Image analysis protocols were established in Volocity for automated analysis of histological sections. The average beta cell section area was obtained by dividing the insulin-stained area by the total number of DAPI-stained nuclei enclosed in this area (minimum of 1.000 cells per tissue). Beta cell average was used to calculate the number of beta cells in islets of db/db pancreata. The beta cell proliferation rate was calculated by counting Ki67-insulin positive nuclei and dividing by the total number of beta cells of each islet. 11-16 islets were analyzed in db/db pancreata. Volocity was used for image display.

Statistical Analysis

Statistical analysis was performed using Prism software. All results are presented as Mean±SEM. Two-tailed unpaired Student's t-test was used to analyze statistical differences between groups. Statistical significance was defined by $p<0.05$.

Example 1

In order to assess the hypoxic phenotype of individual beta cells in the islets of Langerhans immunocytochemistry was performed on pancreata of animal models of pre-diabetes and diabetes using an anti-HIF-1α antibody. The results showed that in contrast with islets of lean mice, HIF-1α protein was detected in the nuclear compartment of beta cells in islets of ob/ob mice, indicating that this cells were sensing hypoxia and presumably had a hypoxic phenotype. Other diabetic mouse models, including db/db and mice fed with a HFD during 1 year, also had hypoxic beta cells that are positive for nuclear staining of HIF-1α.

Example 2

It was investigated in vivo if high levels of glucose metabolism could induce cellular hypoxia in animal models of insulin resistance (pre-diabetes). Pimonidazole was used, that allows detection of hypoxia levels in vivo in islets in the pancreas prior to their isolation. In this study ob/ob (leptin deficient) mice and mice fed a high fat diet (HFD, 60% fat) were used. In response to glucose loading, pancreatic islets of ob/ob or HFD-fed mice were hypoxic when compared to saline injected mice and non-obese controls.

These results demonstrated that high levels of glucose metabolism lead to cellular hypoxia in animal models of pre-diabetes.

Example 3

To investigate hypoxia levels in islets, the hypoxia marker pimonidazole that is widely considered to be a hypoxia-specific dye was used, as it is reduced in cells with low oxygen tension. The resulting derivatives formed protein adducts, which could be detected by specific antibodies.

It was investigated if an increase in glucose metabolism could be correlated with a state of cellular hypoxia. To show in vitro that high levels of glucose metabolism lead to cellular hypoxia, isolated pancreatic islets were cultured in the presence of 22 mM glucose or treated with an activator of glucokinase (GKA50) or both (FIG. 1A). All these experimental conditions led to an increase in the formation of pimonidazole adducts indicating cellular hypoxia. These observations suggested that high levels of glucose metabolism lead to cellular hypoxia presumably due to high mitochondrial metabolic activity and oxygen consumption.

In order to know if additional players involved in the insulin secretion pathway contributed to cellular hypoxia in response to hypermetabolism, islets were treated with the glucokinase activator GKA50 in the presence of nifedipine or diaxozide, a calcium channel inhibitor and a potassium channel activator, respectively. Both of these compounds are known to impair or abrogate insulin secretion. As shown in FIG. 1B, there was no decrease in levels of pimonidazole adducts under these conditions, indicating that only glucose metabolism contributed to cellular hypoxia.

Next, to find out if high glucose metabolism lead to stabilization and activation of transcription factor HIF-1α, islets were treated either with the glucokinase activator or exposed islets to 12% $O_2$ during a period 20 hours. Indeed, activation of glucokinase led to stabilization of HIF-1α and upregulation of the protein encoded by the HIF-1α target gene GLUT1 (FIG. 1C). Addition of the HIF-1α inhibitor PX-478 at a concentration of 50 mM decreased HIF-1α and GLUT1 protein levels. These results showed that high glucose metabolism lead to activation of HIF-1α transcription factor, conferring a hypoxic phenotype to the cells.

To understand the impact of cellular hypoxia and consequently HIF-1α activation on pancreatic islet function, insulin release was assessed in islets treated with the glucokinase activator in the presence or absence of the HIF-1α inhibitor. Experimental conditions were the same as in FIG. 1C. After treatment, the islets were fasted for 2 hours in Krebs buffer in the presence of 3.3 mM glucose, and subsequently static batch incubation was performed. As shown in FIG. 1D the presence of GKA50 led to a dose response-dependent increase in basal insulin secretion without impacting on insulin release at high glucose concentration. The presence of the HIF-1α inhibitor significantly decreased basal insulin secretion levels to near control values with consequent upregulation of the secretory index from 1.2 to 3.4 fold (FIG. 1E). The distinct treatments had no impact on insulin content (FIG. 1F). These results indicate that stabilization and activation of HIF-1α due to high glucose metabolism contributed to deregulation of insulin secretion in response to glucose. In this context, inhibition of HIF-1α was able to restore basal insulin secretion levels.

Example 4

To understand how hyper metabolism affects Ca2+ handling, recorded changes in cytoplasmic free $Ca^{2+}$ ($[Ca^{2+}]_i$) in islets loaded with Fura-2AM were recorded. Islets were treated with the GKA activator during 20 hours and fasted in perfusion buffer containing 3 mM glucose for 2 hours prior to the recording. As presented in FIGS. 2A and C, it was demonstrated that islets that had been previously going through high metabolic activity displayed $[Ca^{2+}]_i$ oscillations already under basal low glucose concentration. In this context, inhibition of HIF-1α activity prevented basal $[Ca^{2+}]_i$ oscillations. Activation of GKA also lead to a faster response to glucose that was not changed by HIF-1α inhibition by PX-478 (FIG. 2D). Considering that islets were fasted 2 hours before changes in $[Ca^{2+}]_i$ were recorded, it was concluded that the presence of basal $[Ca^{2+}]_i$ oscillations resulted from a change in islet phenotype that could be rescued through HIF-1α inhibition. The presence of $[Ca^{2+}]_i$ oscillations at low glucose could also explain the high basal insulin secretion observed in FIG. 1D. In conditions of high metabolic activity, inhibition of HIF-1α prevented the emergence of $[Ca^{2+}]_i$ oscillations at low glucose and consequently restored basal insulin secretion levels. Although PX-478 treatment in the presence of the GKA activator decreased the raise of $[Ca^{2+}]_i$ in response to glucose (FIG. 2E), this did not have any deleterious effect on insulin secretion at high glucose concentration (FIG. 1D).

Example 5

To study the impact of HIF-1α inhibition on progression of diabetes db/db (leptin receptor deficient) mice were treated during 7 weeks with the HIF-1α inhibitor PX-478. Treatment of the animals was initiated when mice were 6 weeks old and the HIF-1α inhibitor was administrated twice a week by intraperitoneal injection (FIG. 3A). Body weight of treated and non-treated db/db mice increased during the experimental period of time without presenting any statistically significantly difference between the two groups of animals (FIG. 3B). As shown in FIG. 3C, in non-treated mice (injected with PBS) non-fasting blood glucose raises from 5 to 9 weeks of age and during the remaining weeks of the experiment glucose values of in the range of 26 to 34 mM were measured. In contrast with these observations, in the db/db mice treated with the HIF-1α inhibitor no increase of glycemia was observed. During the period of treatment blood glucose, (with the exception of week 9; 9 versus 5 weeks old, p value <0.05), remained stable and not statistically significantly different from the values measured at week 5 of age. Glycemia of db/db treated with PX-478 was statistically significant different from the blood glucose of non-treated mice has indicated in FIG. 3C ( p<0.01, * p<0.001).

As shown in FIG. 3D, 5 weeks old db/db mice were hyperinsulinemic with plasma insulin levels 10-15 fold higher than in db/+ control mice. In non-treated db/db mice plasma insulin dropped in an age-dependent manner while mice treated with the HIF-1α inhibitor remained hyperinsulinemic until the end of the experiment. These results suggest that in treated mice pancreatic beta cells maintain the ability to secrete high levels the insulin that compensate for the high insulin resistance that characterizes this mouse model and therefore the blood glucose remains near normoglycemia. In contrast, in non-treated mice, beta cell function decreased and presumably collapses leading to lowered levels of plasma insulin and the raise of blood glucose. Considering that in this mice cohort blood glucose at 5 weeks of age was 12.3 mM (mean value of 10 mice) and 10.6 mM (mean value of 9 mice), in PBS and PX-478 treated mice, respectively, the data shows that treatment with PX-478 is able to prevent/delay the onset or progression of diabetes.

Example 6

Figure 10A:
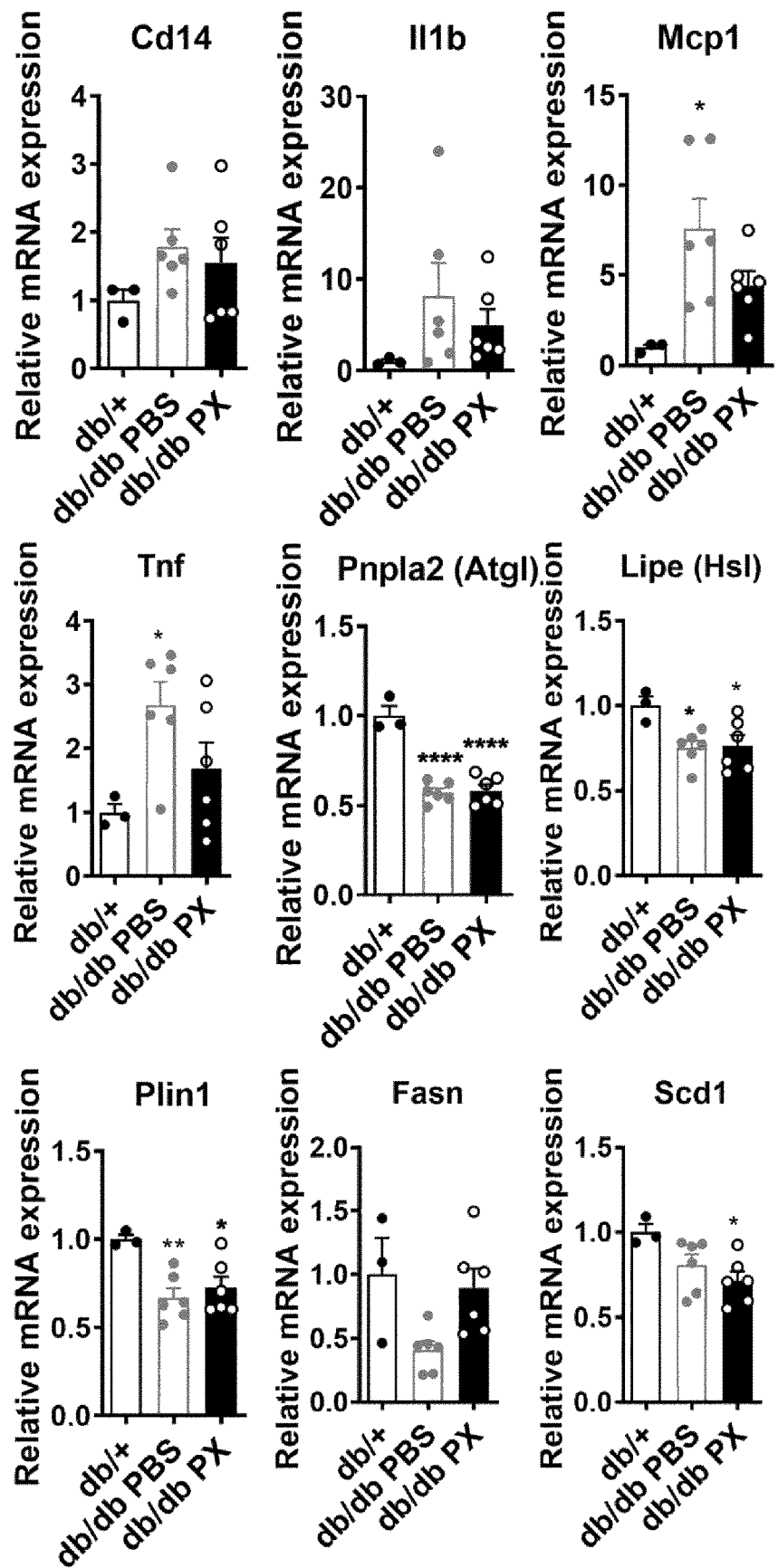
FIG. 10 illustrates gene expression analysis of visceral white adipose tissue in db/db mice after treatment with the HIF-1α inhibitor.
Figure 10B:
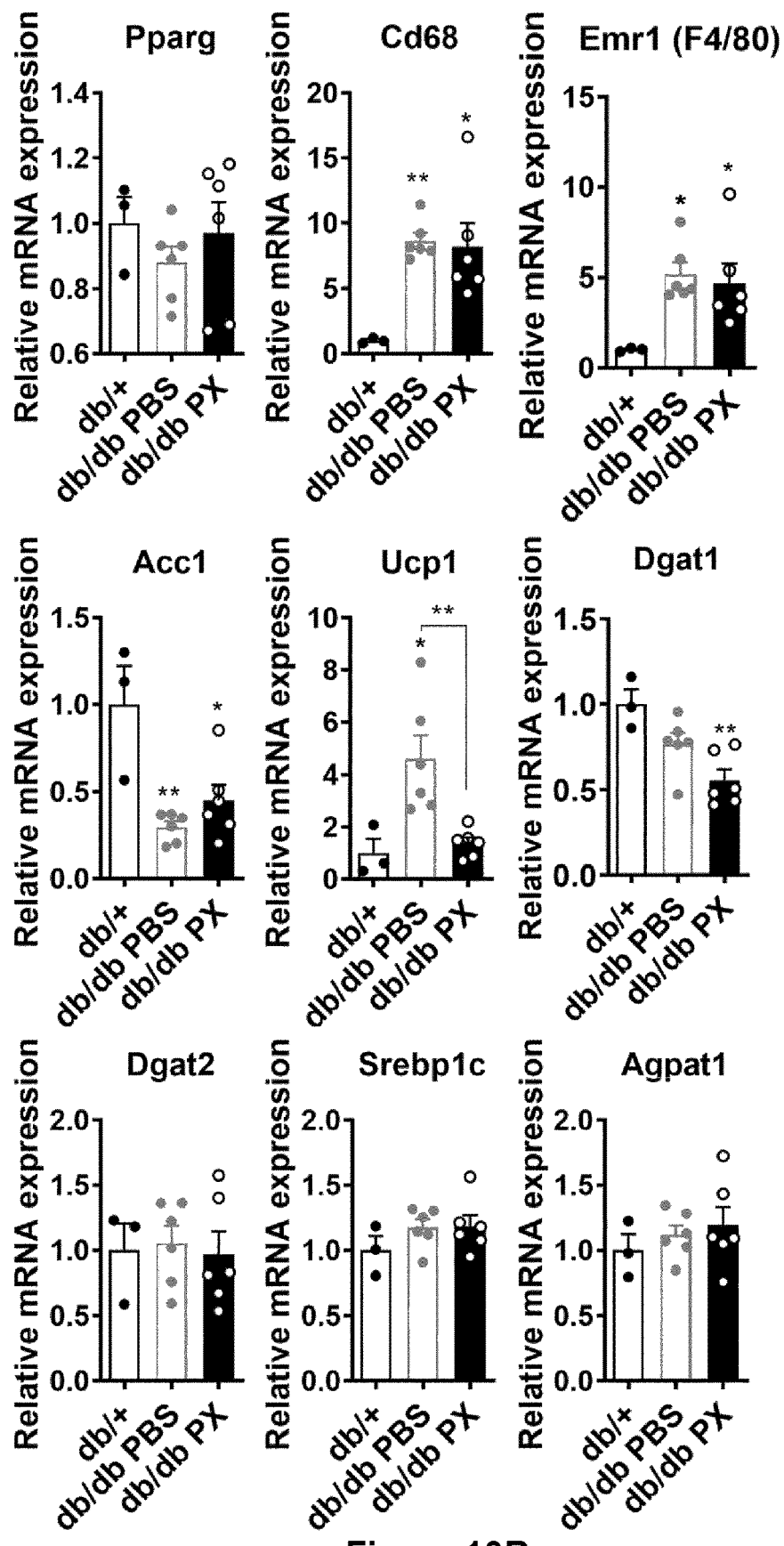
Figure 10C:
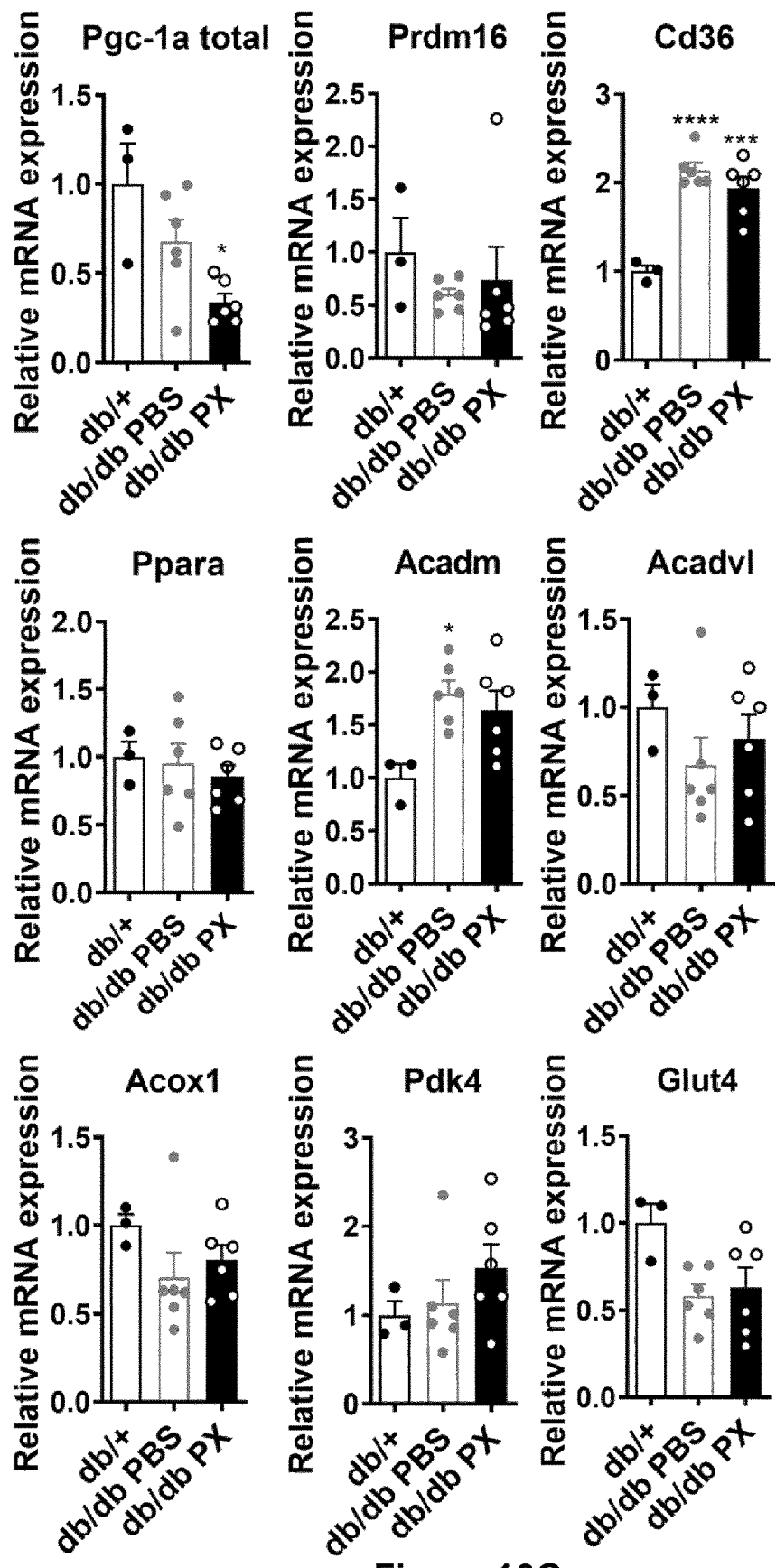
Figure 11A:
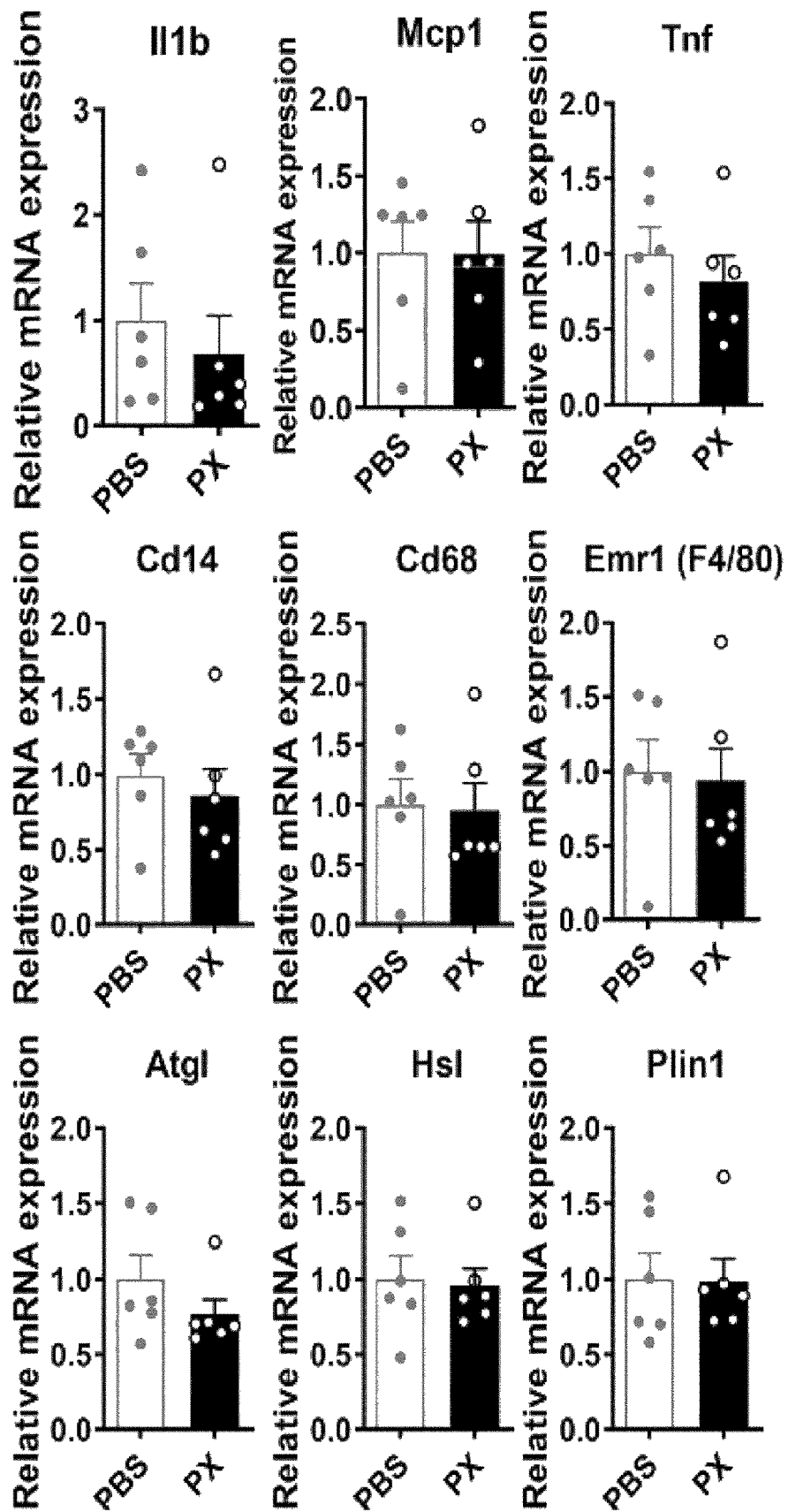
FIG. 11 illustrates gene expression analysis of subcutaneous white adipose tissue in db/db mice after treatment with the HIF-1α inhibitor.
Figure 11B:
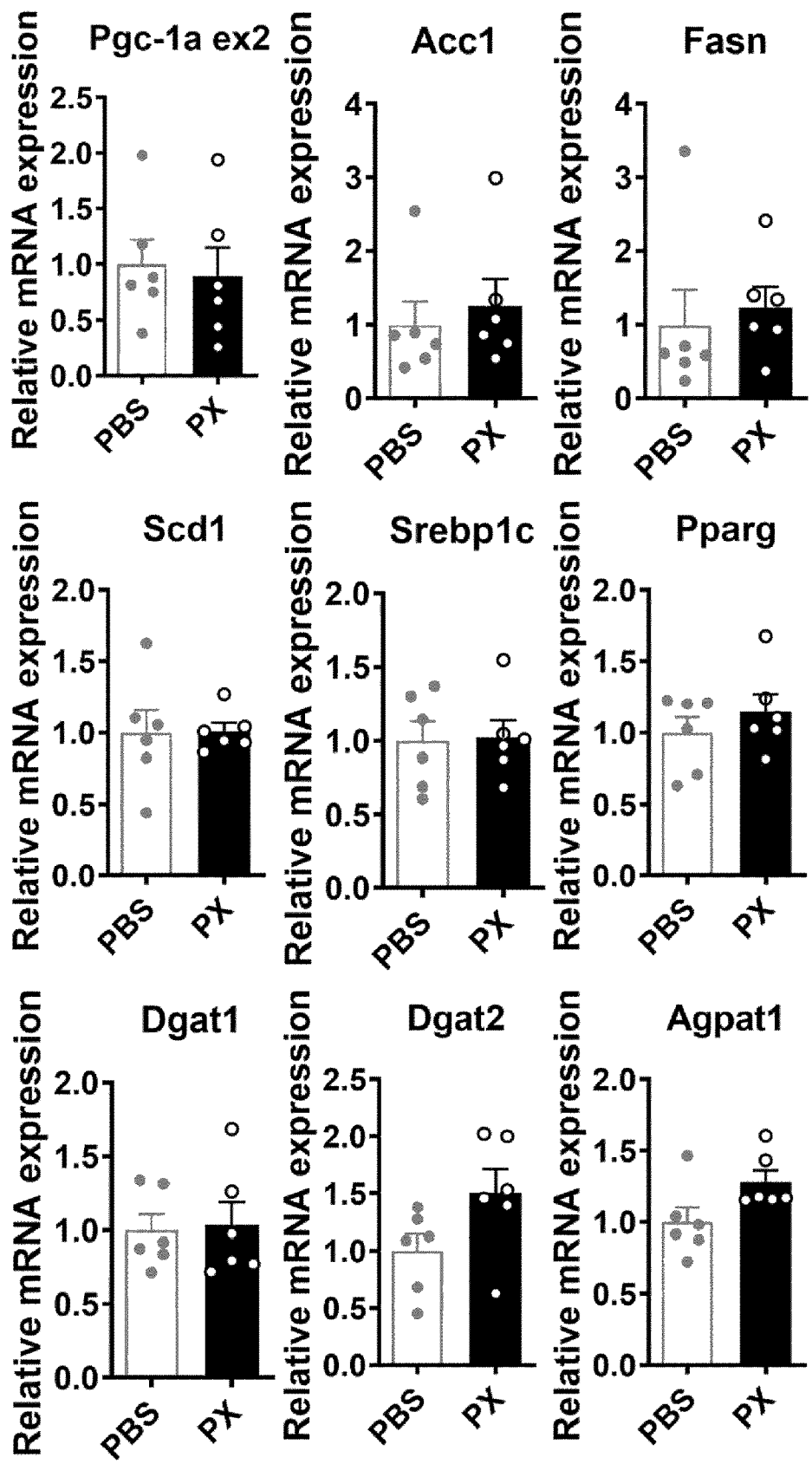
Figure 11C:
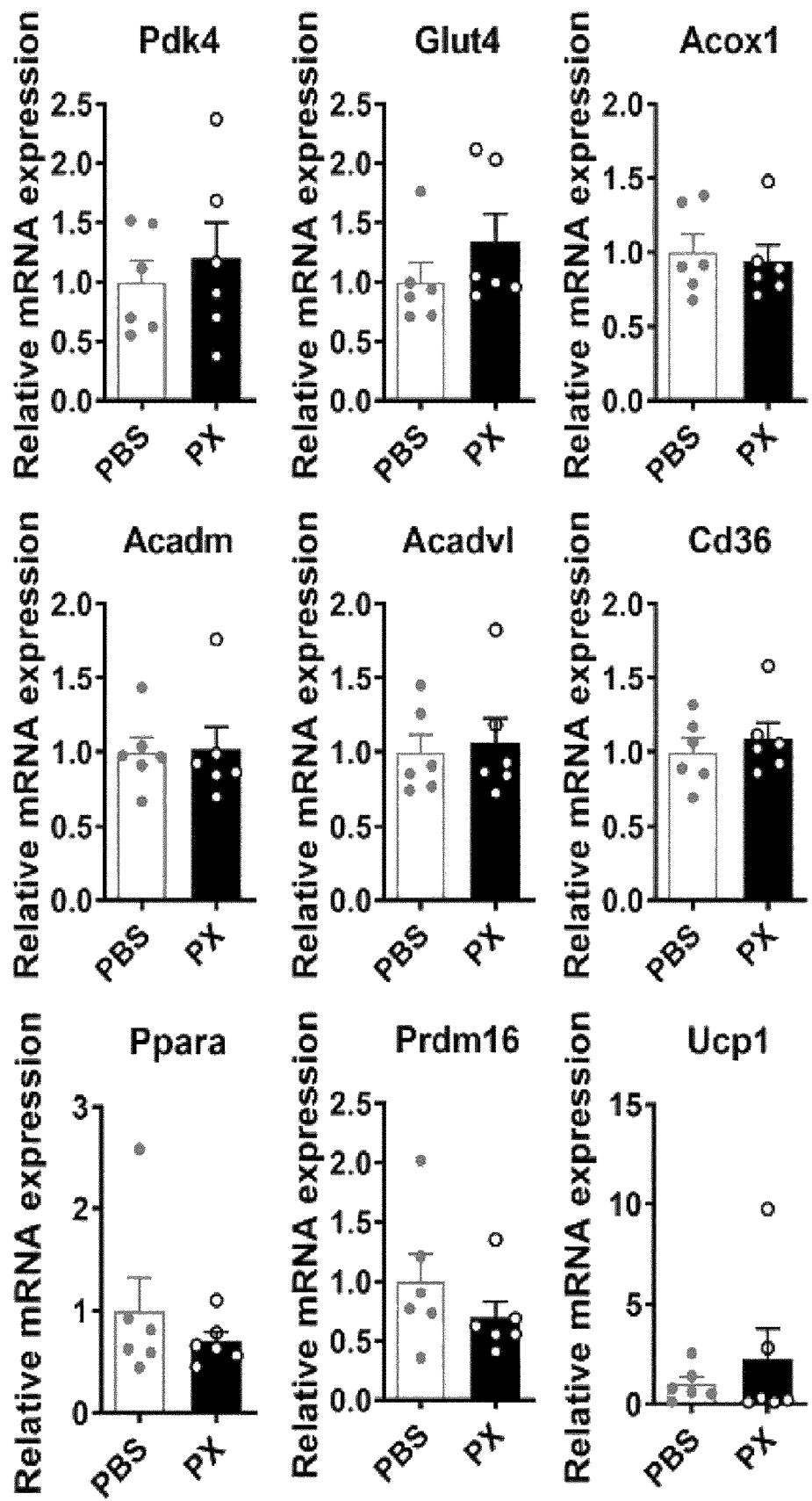

To further characterize the metabolic state of the animals, glucose and insulin tolerance tests were performed. db/db mice treated with the HIF-1α inhibitor showed improved tolerance to glucose (FIG. 4A) without improvement of peripheric insulin sensitivity (FIG. 4C). After 6 hours of fasting treated animals presented low blood glucose and plasma insulin levels that were 2 fold higher that in non-treated db/db mice. Considering that insulin sensitivity did not improve it was interpreted that this data was an indication that better tolerance to glucose was a consequence of elevated levels of plasma insulin. Previous studies showed that mice fed with a HFD and treated with the HIF-1α inhibitor present better insulin sensitivity presumably due to the direct impact of HIF-1α inhibition in white adipose tissue (WAT). To confirm, that in contrast with mice fed with a HFD, db/db mice receiving a dose of 30-40 mg per kg bodyweight of PX-478 IP did not improved WAT insulin sensitivity, gene expression analysis of visceral (FIG. 10) and subcutaneous (FIG. 11) WAT was performed. As presented in FIGS. 10 and 11, no major change in gene expression was observed in db/db mice groups. These results were in agreement with the ITT data and indicated that the observed phenotype results from the ability of beta cells to produce high amounts of insulin as a compensatory mechanism to counteract insulin resistance.

Example 7

To better understand the impact of the HIF-1α inhibitor on the endocrine pancreas the proliferation levels of beta cells in db/db mice was investigated. Treated animals presented a higher rate of proliferating beta cells as assessed by Ki67 staining than untreated mice (FIG. 5). This could contribute to increased functional beta cell mass under stress conditions.

Figure 14:
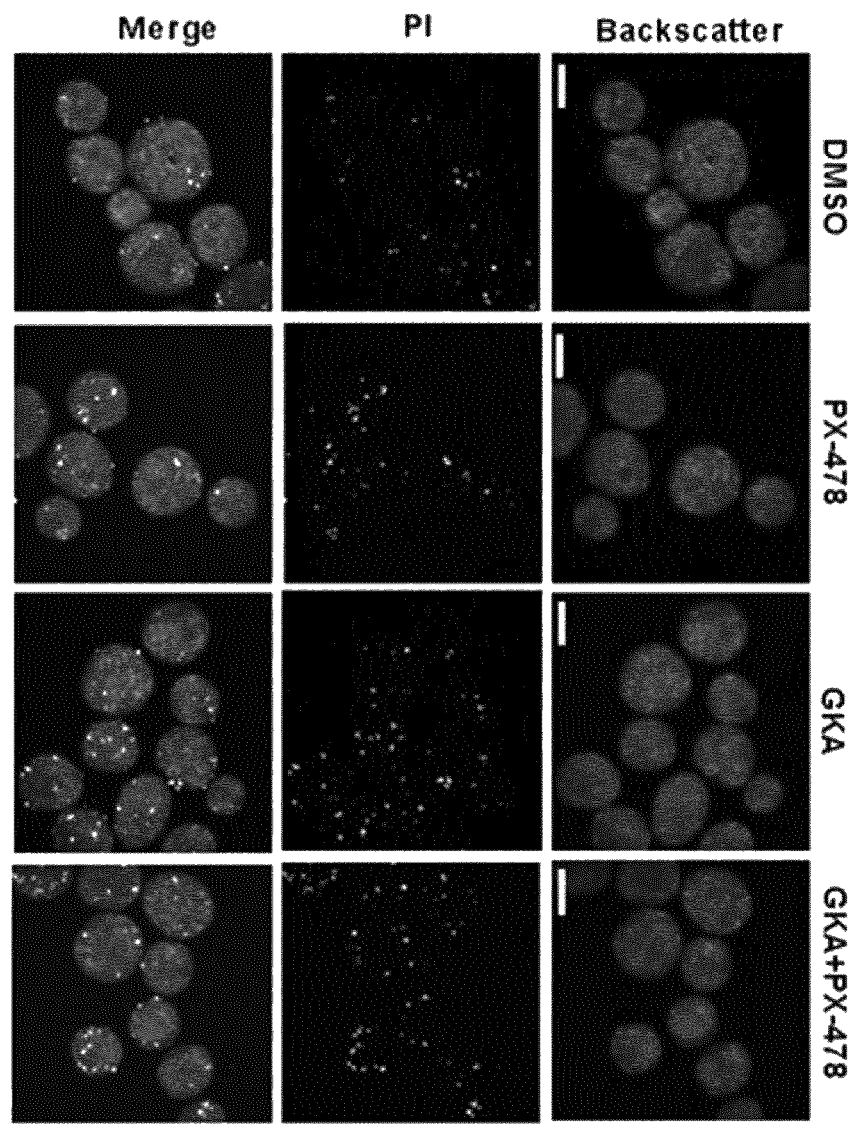
FIG. 14 illustrates analysis of cell viability using propidium iodide.

A change in islet architecture is observed in several mouse models of diabetes. The architecture of the islets of db/db mice was investigated by staining of the distinct endocrine cells (alpha, beta and delta cells). The results (FIG. 6) showed that the ratio of beta/alpha and beta/delta in treated mice was higher than in non-treated mice. As shown in FIG. 6, the number of alpha and delta cells present in the gastric/duodenal part of control mice (dk/+) pancreata was reduced when compared to islets of the splenic part. In non-treated db/db mice there was a clear increase in the number of alpha and delta cells in both parts of the pancreas when compared to control mice. Treatment of mice with PX-478 reduced the number of glucagon and somatostatin-producing cells in db/db mice indicating that the HIF-1α inhibitor increased the islet ratio of beta to alpha and beta to delta cells leading to islet architecture being more similar to the one present in control animals. The area of α, β or δ cells was investigated when compared to the total area of these three endocrine cell types, in PX-478 treated or non-treated db/db mice. As shown in FIGS. 6 and 14, the area of each distinct endocrine cell type is different in islets present in the gastric/duodenal part of the pancreas when compared to the splenic region. Islets of animals treated with PX-478 showed, in both part of the pancreas, increased p cell area with a concomitant reduction in a and 6 cell area. These observations suggest that PX-478 might increase the ability to expand p cell mass in response to high metabolic overload.

Figure 13:
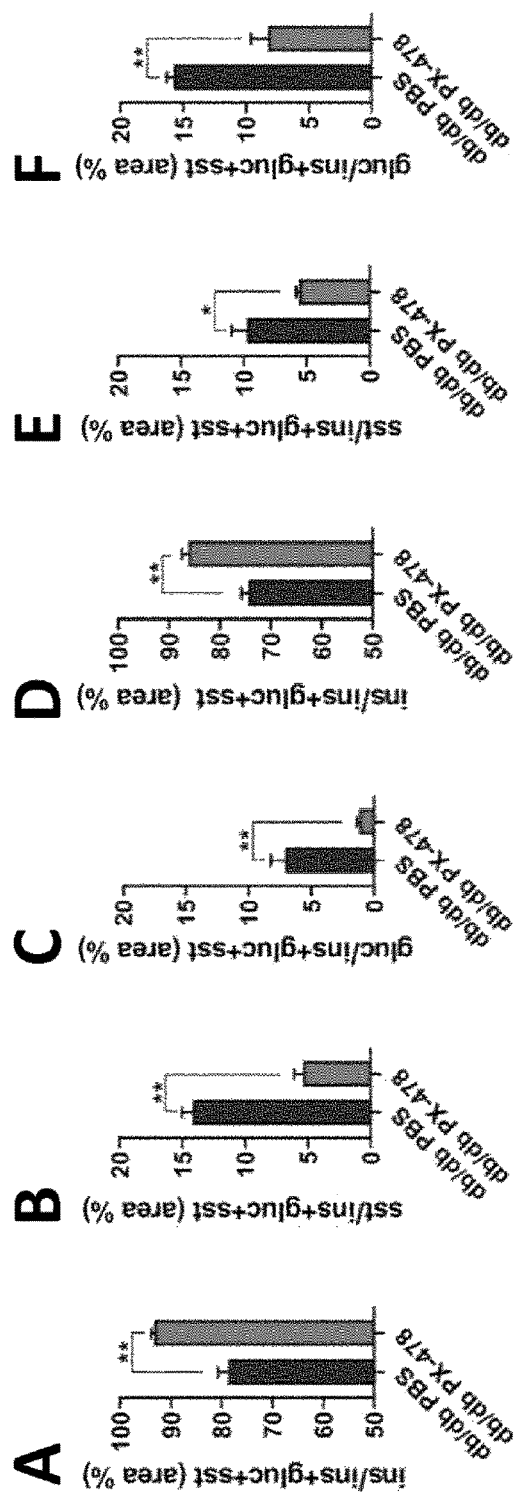
FIG. 13 shows quantification of the area of insulin (ins), somatostatin (sst) and glucagon (gluc) positive cells in the gastric/duodenal (A), (B) and (C) or splenic (D), (E) and (F) region of db/db pancreases using pancreata of PX-478-treated and non-treated db/db mice.

FIG. 13 relate to FIG. 6 and show quantification of the area of insulin (ins), somatostatin (sst) and glucagon (gluc) positive cells in the gastric/duodenal (A), (B) and (C) or splenic (D), (E) and (F) region of db/db pancreases. Pancreata of PX-478-treated (n=3) and non-treated (n=3) db/db mice were used in this study. 10 islets of each region, gastric/duodenal or splenic of pancreas were imaged per mouse. Size bars=100 μm. * p<0.05, ** p<0.01.

Example 8

Another cohort of db/db mice that were already hyperglycemic (mean values of blood glucose of 16.4 mM, PBS group and 17.8 mM, PX-478 group) at the age of 5 weeks old were also studied. Besides increased blood glucose levels, when compared to the cohort of FIG. 3, these 5 old weeks mice had increased body weight and higher plasma insulin levels, indicating that the animals were already in a more advanced stated of the disease. Treatment of these db/db mice with 40 mg of kg of body weight of the HIF-1α inhibitor decreased blood glucose in a time-dependent manner (FIG. 7C) without significantly affecting body weight (FIG. 7B). Although plasma insulin levels decreased in treated and non-treated mice from 5 to 9 weeks of age, in the end of the study animals treated with PX-478 presented a 2.5 fold higher level of insulin when compared with PBS injected group (FIG. 7D). These results indicated that beta cells of treated mice maintain a better functionality and were able to secrete high levels of insulin to compensate to insulin resistance. In conclusion, this study shows that treatment with the HIF-1α inhibitor not only prevents or delays the onset of diabetes but it is also able to revert overt diabetes.

Example 9

To investigate if the HIF-1α inhibitor improves glycemia in mice with reduced beta cell mass and normal insulin sensitivity, beta cell mass in C57BL6J mice was ablated by using streptozotocin (STZ), a compound that has a preferential toxicity toward beta cells. A low dose of the toxin was administrated daily during 5 consecutive days in order to only partially ablate beta cell number. As shown in FIG. 8, pancreatic islets of STZ-treated mice still contained beta cells. However, when compared with control animal islets, they presented a distinct architecture with a higher number of alpha and delta cells distributed throughout the islet. The reduction of beta cell number with the preservation of other endocrine cell number is a hallmark of diabetes type 1. As illustrated in FIG. 9B, the body weight of STZ-treated mice did not significantly change during the course of this experiment. Treatment of these mice with 40-45 mg per kg of body weight of PX-478 significantly decreased blood glucose concentration (FIGS. 9A and C) with the concomitant increase of plasma insulin concentration. These results showed that treatment with the HIF-1α inhibitor was able to improve glycemia in a mouse with reduced beta cell mass suggesting that PX-478 might have a positive impact on delaying progression of diabetes on type 1 mouse models.

Example 10

Using the same experimental setup as in Example 3 (i.e. GCK activation), it was sought to determine if high glucose metabolism leads to HIF-1α stabilization and activation. Thus, islets were treated with GKA50 or exposed them to 12% $O_2$ during a period of 20 hours. The results showed that increasing GCK activity led to HIF-1α stabilization and increased GLUT1 protein levels (FIG. 12A). Conversely, under conditions of high glucose metabolism, addition of the HIF-1α inhibitor PX-478 decreased HIF-1α and GLUT1 protein levels. Induction of Glut1 gene expression, as well as other HIF-1-target genes including Insulin-like growth factor-binding protein 3 (Igfbp3), Hexokinase 2 (Hk2), Phosphoglycerate kinase 1 (Pgk1) and Pdk1, was also observed in islets treated with the GKA50 (FIGS. 12B-3F). In contrast, mRNA expression of Ldha and BCL2-interacting protein 3 (Bnip3), which is upregulated in islets in response to hypoxia, were not induced by GKA50 treatment (FIGS. 12G and 12H). Under these experimental conditions, Gck mRNA level was reduced when compared to untreated islets (FIG. 12I). In islets treated with GKA50, inhibition of HIF-1α activity by PX-478 significantly decreased the expression of Glut1, Igfbp3, Hk2 and Pgk1 (FIG. 12B-12E). These results demonstrate that high glucose metabolism leads to stabilization and activation of HIF-1α and upregulation of expression of several HIF-1α-target genes.

Example 11

Analysis of cell viability using propidium iodide was performed. Islets were treated for 20 hours as in Example 10, before incubation with propidium iodide (PI) for 10 min prior to imaging by confocal microscopy. Analysis of cell death showed that the treatment with PX-478 does not decrease cell viability in islets, regardless of GKA50 co-treatment (FIG. 14). Size bars=100 μm.

REFERENCES

Agarwal, S., Loder, S., Brownley, C., Cholok, D., Mangiavini, L., Li., J., Breuler, C., Sung, H. H., Li, S., Ranganathan, K., Peterson, J., Tompkins, R., Herndon, D., Xiao, W., Jumlongras, D., Olsen, B. R., Davis, T. A., Mishina, Y., Schipani, E., Levi, B. (2015) Inhibition of HIF1-α prevents both trauma-induced and genetic heterotopic ossification. Proc. Natl. Acad. Sci. U.S.A 113, E338-347.

Bensellam, M., Duvilli6, B., Rybachuk, G., Laybutt, D. R., Magnan, C., Guiot, Y., Pouysségur, J., and Jonas, J. C. (2012) Glucose-induced $O_2$ consumption activates hypoxia inducible factors 1 and 2 in rat insulin-secreting pancreatic beta-cells. PLoS One 7, e29807.

Cockman, M. E., Masson, N., Mole, D. R., Jaakkola, P., Chang, G. W., Clifford, S. C., Maher, E. R., Pugh, C. W., Ratcliffe, P. J., and Maxwell, P. H. (2000) Hypoxia-inducible factor-alpha binding and ubiquitylation by the von Hippel-Lindau tumor suppressor protein. J. Biol. Chem. 275, 25733-25741.

Gonzalez, F. J., and Jiang, C. (2012) Methods for decreasing body weight and treating diabetes. WO 2012/082765 A2.

Kaelin, W. G., Jr., and Ratcliffe, P. J. (2008) Oxygen sensing by metazoans: the central role of the HIF hydroxylase pathway. Mol. Cell 30, 393-402.

Jacoby, J. J., Erez, B., Korshunova, M. V., Williams, R. R., Furutani, K., Takahasi, O., Kirkpatrick, L., Lippman, S. M., Powis, G., O'Reilly, M. S., and Herbst, R. S. (2010) Treatment with HIF-1α antagonist PX-478 inhibits progression and spread of orthotopic human small cell lung cancer and lung cancer adenocarcinoma in mice. J. Thorac. Oncol. 5, 940-949.

Kheshtchin, N., Arab, S., Ajami, M., Mirzaei, R., Ashourpour, M., Mousavi, N., Khosravianfar, N., Jadidi-Njaragh, F., Namdar, A., Noorbakhsh, F., and Hadjati, J. (2016) Inhibition of HIF-1α enhances anti-tumor effects of dendritic call-based vaccination in a mouse model of breast cancer. Cancer Immunol. Immunother. 65, 1159-1167.

Ohh, M., Park, C. W., Ivan, M., Hoffman, M. A., Kim, T. Y., Huang, L. E., Pavletich, N., Chau, V., and Kaelin, W. G. (2000) Ubiquitination of hypoxia-inducible factor requires direct binding to the beta-domain of the von Hippel-Lindau protein. Nat. Cell. Biol. 2, 423-427.

Sato, Y., Endo, H., Okuyama, H., Takeda, T., Iwahashi, H., Imagawa, A., Yamagata, K., Shimomura, I., and Inoue, M. (2011) Cellular hypoxia of pancreatic beta-cells due to high levels of oxygen consumption for insulin secretion in vitro. J. Biol. Chem. 286, 12524-12532.

Semenza, G. L. (2012) Hypoxia-inducible factors: mediators of cancer progression and targets for cancer therapy. Trends Pharmacol. Sci. 33, 207-214.

Sun, K., Halberg, N., Khan, M., Magalang, U. J. and Scherer, P. E. (2013) Selective inhibition of hypoxia-inducible factor 1α ameliorates adipose tissue function. Mol. Cell. Biol. 33, 904-917.

Tanimoto, K., Makino, Y., Pereira, T., and Poellinger, L. (2000) Mechanism of regulation of the hypoxia-inducible factor-1 alpha by the von Hippel-Lindau tumor suppressor protein. EMBO J. 19, 4298-4309.

Schwartz, D. L., Powis, G., Thitai-Kumar, A., He, Y., Bankson, J., Williams, R., Lemos, R., Oh, J., Volgin, A., Soghomonyan, S., Nishii, R., Alauddin, M., Mukhopadhay, U., Peng, Z., Bornmann, W., and Gelovani, J. (2009) The selective hypoxia-inducible factor-1 inhibitor PX-478 provide in vivo radiosensitization through tumor stromal effects. Mol. Cancer Ther. 8, 947-958.

Schwartz, D. L., Bankson, J. A., Lemos, Jr., R., Lai, S. Y., Thittai, A. K., He, Y., Hostetter, G., Demeure, M. J., Von Hoff, D. D., and Powis, G. (2010) Radiosensitization and stromal imaging response correlates for the HIF-1 inhibitor PX-478 given with or without chemotherapy in pancreatic cancer. Mol. Cancer Ther. 9, 2057-2067.

Welsh, S., Williams, R., Kirkpatrick, L., Paine-Murrieta, G., and Powis, G (2004) Antitumor activity and pharmacodynamics properties of PX-478, an inhibitor of hypoxia-inducible factor-1a. Mol. Cancer Ther. 3, 233-244.

The invention claimed is:

1. A method of treatment, comprising: administering a therapeutically effective amount of PX-478 to a subject that has diabetes mellitus type 1.

2. The method according to claim 1, wherein said PX-478 is administered for a treatment period of at least 1-12 weeks.

3. The method according to claim 1, wherein said method provides decreased blood glucose in said subject.

4. The method according to claim 1, wherein said method provides increased glucose tolerance in said subject.

5. The method according to claim 1, wherein said method provides sustained or increased plasma insulin and/or c-peptide levels.

6. The method according to claim 1, wherein said method provides an improved pancreatic islet function by at least one of: preventing beta cell collapse, restoring basal insulin secretion and increasing insulin secretory index in said subject.

7. The method according to claim 1, wherein said method elevates the rate of beta-cell proliferation in pancreatic beta cells, as compared to a non-treated subject.

8. The method according to claim 1, wherein said method provides a change in phenotype of the pancreatic beta cells in said subject.

9. The method according to claim 1, wherein said PX-478 is administered at least once per week but no more than every second day.

10. The method according to claim 1, wherein said PX-478 is administered through intraperitoneal injection, oral administration, intravenous injection or by subcutaneous injection.

11. The method according to claim 1, wherein said subject is a human, a cat, a dog, a pig, a horse or a mouse.

* * * * *